(12) United States Patent
Rapaport et al.

(10) Patent No.: US 9,277,533 B2
(45) Date of Patent: Mar. 1, 2016

(54) SCALABLE VIDEO CODING OVER SIMULTANEOUS UNICAST/MULTICAST LTE DL SHARED CHANNEL

(71) Applicant: VID Scale, Inc., Wilmington, DE (US)

(72) Inventors: Avi Rapaport, Shoham (IL); Samian J. Kaur, Plymouth Meeting, PA (US); Liangping Ma, San Diego, CA (US); Weimin Liu, Chatham, NJ (US); Ariela Zeira, Huntington, NY (US); Zhifeng Chen, San Diego, CA (US); Stephen E. Terry, Northport, NY (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 13/897,169

(22) Filed: May 17, 2013

(65) Prior Publication Data

US 2013/0315124 A1 Nov. 28, 2013

Related U.S. Application Data

(60) Provisional application No. 61/648,235, filed on May 17, 2012.

(51) Int. Cl.
*H04H 20/71* (2008.01)
*H04W 72/00* (2009.01)
(Continued)

(52) U.S. Cl.
CPC ............. *H04W 72/005* (2013.01); *H04L 1/00* (2013.01); *H04W 4/08* (2013.01); *H04W 4/18* (2013.01)

(58) Field of Classification Search
CPC .................................................. H04W 72/005
USPC ......... 370/227, 252–253, 328–339, 342–355; 455/501–522
See application file for complete search history.

(56) References Cited

U.S. PATENT DOCUMENTS

2011/0044391 A1 2/2011 Ji et al.
2011/0249633 A1 10/2011 Hong et al.
(Continued)

FOREIGN PATENT DOCUMENTS

WO WO2011146653 A1 * 11/2011

OTHER PUBLICATIONS

3$^{rd}$ Generation Partnership Project (3GPP), TS 36.331 V10.0.0, "3$^{rd}$ Generation Partnership Project; Technical Specification Group Radio Access Network; Evolved Universal Terrestrial Radio Access (E-UTRA); Radio Resource Control (RRC); Protocol specification", Release 10, Dec. 2010, 276 pages.
(Continued)

*Primary Examiner* — Iqbal Zaidi
(74) *Attorney, Agent, or Firm* — Condo Roccia Koptiw LLP

(57) ABSTRACT

Embodiments contemplate devices and techniques for receiving unicast and multicast transmissions over a downlink (DL) shared channel in parallel, for example an LTE DL shared channel (SCH). For example, one or more hybrid automatic repeat request (HARQ) entities may be configured to perform retransmissions of the multicast and/or unicast messages. Common and/or dedicated (e.g., separate) HARQ entities may be utilized for retransmission. The multicast downlink shared channels may be activated and/or deactivated on demand. The activation and/or deactivation may be performed using radio resource control (RRC) signaling and/or Medium Access Control (MAC) signaling. The multicast and/or unicast downlink shared channel data may include scalable video coding (SVC) data of varying priority. Embodiments also contemplate the use of simultaneous (e.g. parallel) multicast/unicast for scalable video coding transmission over WiFi/802.11 protocol signals.

18 Claims, 22 Drawing Sheets

(51) Int. Cl.
  *H04L 1/00* (2006.01)
  *H04W 4/08* (2009.01)
  *H04W 4/18* (2009.01)

(56) References Cited

U.S. PATENT DOCUMENTS

| | | | |
|---|---|---|---|
| 2012/0039180 A1 | 2/2012 | Kim et al. | |
| 2012/0077466 A1* | 3/2012 | O'Mahony et al. | 455/414.1 |
| 2013/0051264 A1* | 2/2013 | Wang et al. | 370/252 |
| 2013/0322382 A1* | 12/2013 | Dinan | 370/329 |

OTHER PUBLICATIONS

3$^{rd}$ Generation Partnership Project (3GPP), TS 36.321 V10.1.0, "3$^{rd}$ Generation Partnership Project; Technical Specification Group Radio Access Network; Evolved Universal Terrestrial Radio Access (E-UTRA); Medium Access Control (MAC) protocol specification", Release 10, Mar. 2011, 53 pages.

3$^{rd}$ Generation Partnership Project (3GPP), TS 36.323 V10.1.0, "3$^{rd}$ Generation Partnership Project; Technical Specification Group Radio Access (E-UTRA); Packet Data Convergence Protocol (PDCP) specification", Release 10, 26 pages.

Ranveer Chandra, et al., "DirCast: A Practical and Efficient Wi-Fi Multicast System", ICNP 2009, 10 pages.

Harri Holma, et al., "LTE for UMTS OFDMA and SC-FDMA Based Radio Access", 2009, 450 pages.

IEEE Standards Association, IEEE Standard for Information technology—Telecommunications and information exchange between systems; Local and metropolitan area networks-Specific requirements, "Part 11: Wireless LAN Medium Access Control (MAX) and Physical Layer (PHY) Specifications", XP-002731582, Mar. 29, 2012, 212 pages.

International Telecommunication Union, Telecommunication Standardization Sector of ITU-T, "Series H: Audiovisual and Multimedia Systems; Infrastructure of audiovisual services—Coding of moving video; Advanced video coding for generic audiovisual services", Nov. 2007, 564 pages.

* cited by examiner

US 9,277,533 B2

SCALABLE VIDEO CODING OVER SIMULTANEOUS UNICAST/MULTICAST LTE DL SHARED CHANNEL

CROSS-REFERENCE TO RELATED APPLICATIONS

This application claims the benefit of U.S. Provisional Application No. 61/648,235, filed May 17, 2012, titled "SCALABLE VIDEO CODING OVER SIMULTANEOUS UNICAST/MULTICAST LTE DL SHARED CHANNEL", the entire contents of which being hereby incorporated by reference herein, for all purposes.

BACKGROUND

Scable video coding (SVC) is a standardized technique that may include the encoding of a high-quality video bitstream that may also contain one or more subset bitstreams. A subset video bitstream may be derived by dropping packets from the larger video to reduce the bandwidth required for the subset bitstream. The subset bitstream can represent a lower spatial resolution, lower temporal resolution, and/or lower quality video signal, for example.

Unicasting may include the transmission of messages to a single network destination that may be identified by a unique address, perhaps where privacy and/or unique network resources may be useful.

Multicasting may include the transmitting of a message or information to a group of destination devices simultaneously in perhaps a single transmission from a source. Multicasting may be referred to as one-to-many communication, such as over an Internet Protocol (IP) based communication network.

SUMMARY

Embodiments contemplate one or more techniques and systems for receiving unicast and multicast transmissions over a downlink shared channel in parallel. For example, hybrid automatic repeat request (HARQ) entities may be configured to perform retransmissions of the multicast and/or unicast messages. Common and/or dedicated (e.g., separate) HARQ entities may be utilized for retransmission. The multicast downlink shared channels may be activated and/or deactivated on demand. The activation and/or deactivation may be performed using radio resource control (RRC) signaling and/or Medium Access Control (MAC) signaling. The multicast and/or unicast downlink shared channel data may include scalable video coding (SVC) data of varying priority.

Embodiments contemplate one or more technqiues for a wireless transmit receive unit (WTRU) to receive data. One or more techniques may include receiving a configuration at the WTRU for a first downlink shared channel (first DL-SCH) for one or more unicast transmissions. Techniques may also include receiving a configuration at the WTRU for a second downlink shared channel (second DL-SCH) for one or more multicast transmissions. Techniques may also include receiving at the WTRU at least one multicast transmission over the second DL-SCH in parallel with at least one unicast transmission over the first DL-SCH.

Embodiments contemplate a wireless transmit/receive unit (WTRU) that may comprise a processor configured at least in part to receive a configuration for a first downlink shared channel (first DL-SCH) for one or more unicast transmissions. The processor may also be configured to receive a configuration for a second downlink shared channel (second DL-SCH) for one or more multicast transmissions. The processor may also be configured to receive at least one multicast transmission over the second DL-SCH in parallel with at least one unicast transmission over the first DL-SCH.

Embodiments contemplate an evolved node-B (eNB) that may comprise a processor that may be configured, at least in part to provide a configuration for a first downlink shared channel (first DL-SCH) for one or more unicast transmissions. The processor may also be configured to provide a configuration for a second downlink shared channel (second DL-SCH) for one or more multicast transmissions. The processor may also be configured to initiate the sending of at least one multicast transmission over the second DL-SCH in parallel with at least one unicast transmission over the first DL-SCH.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application.

Figure 1A:
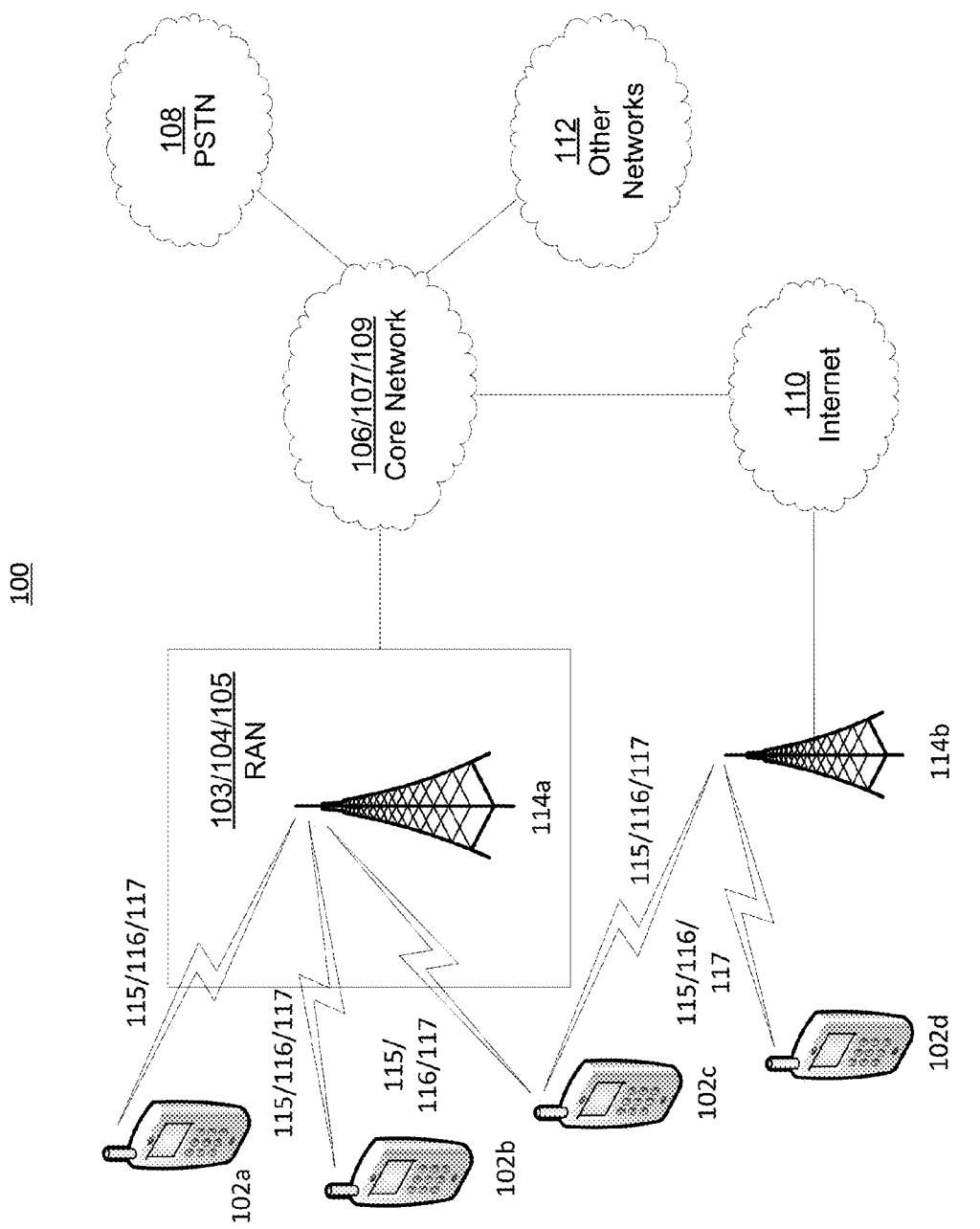
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA20001X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
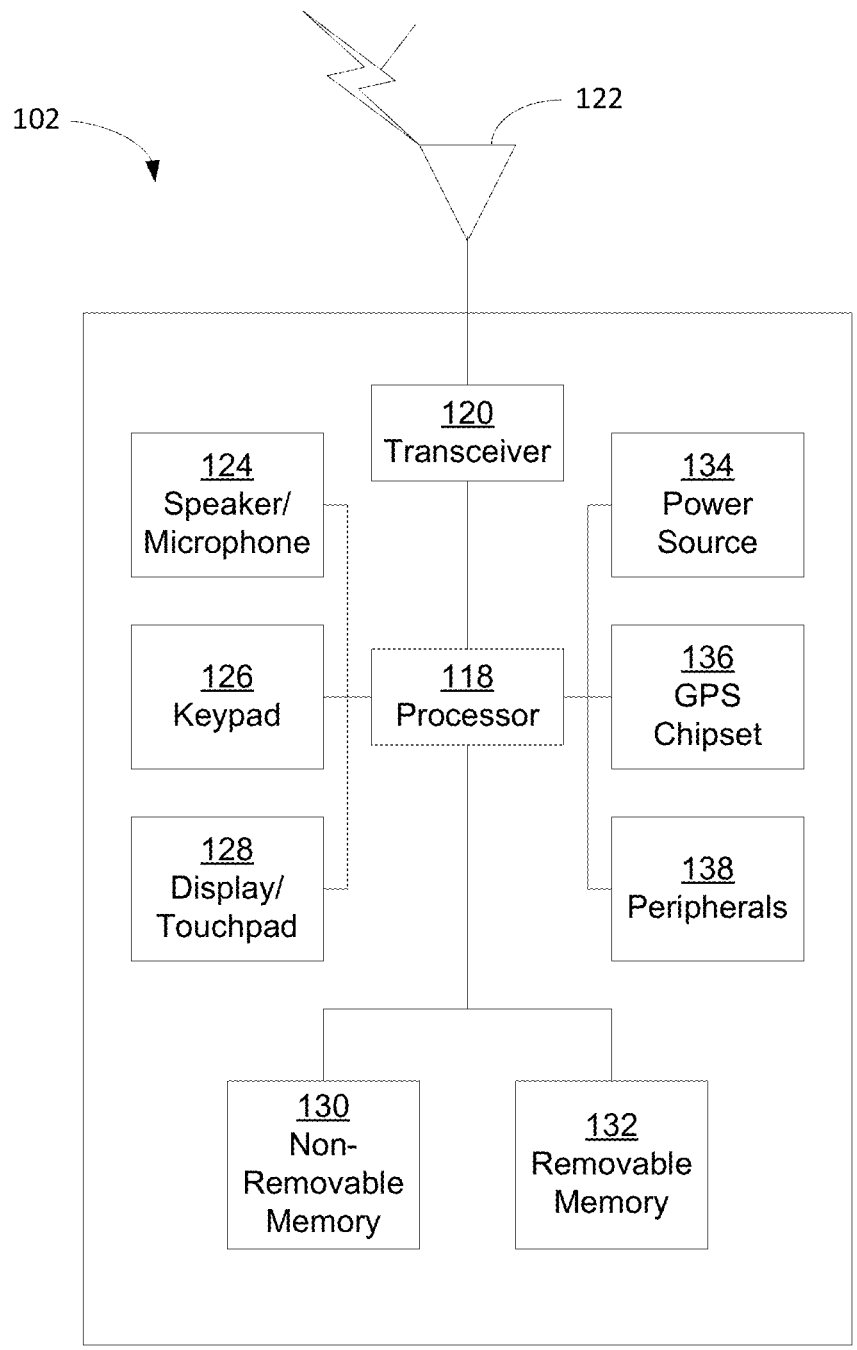
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
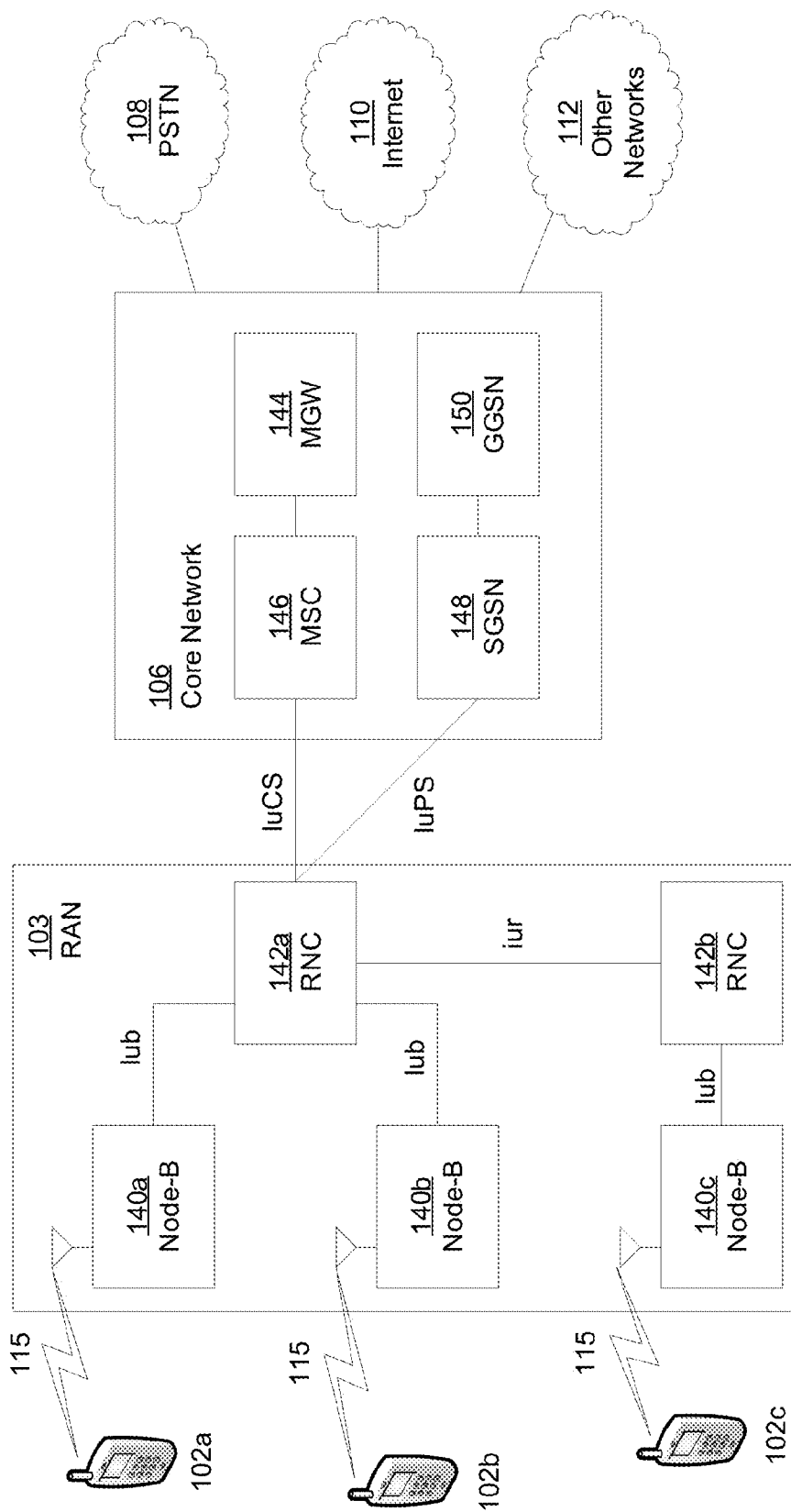
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
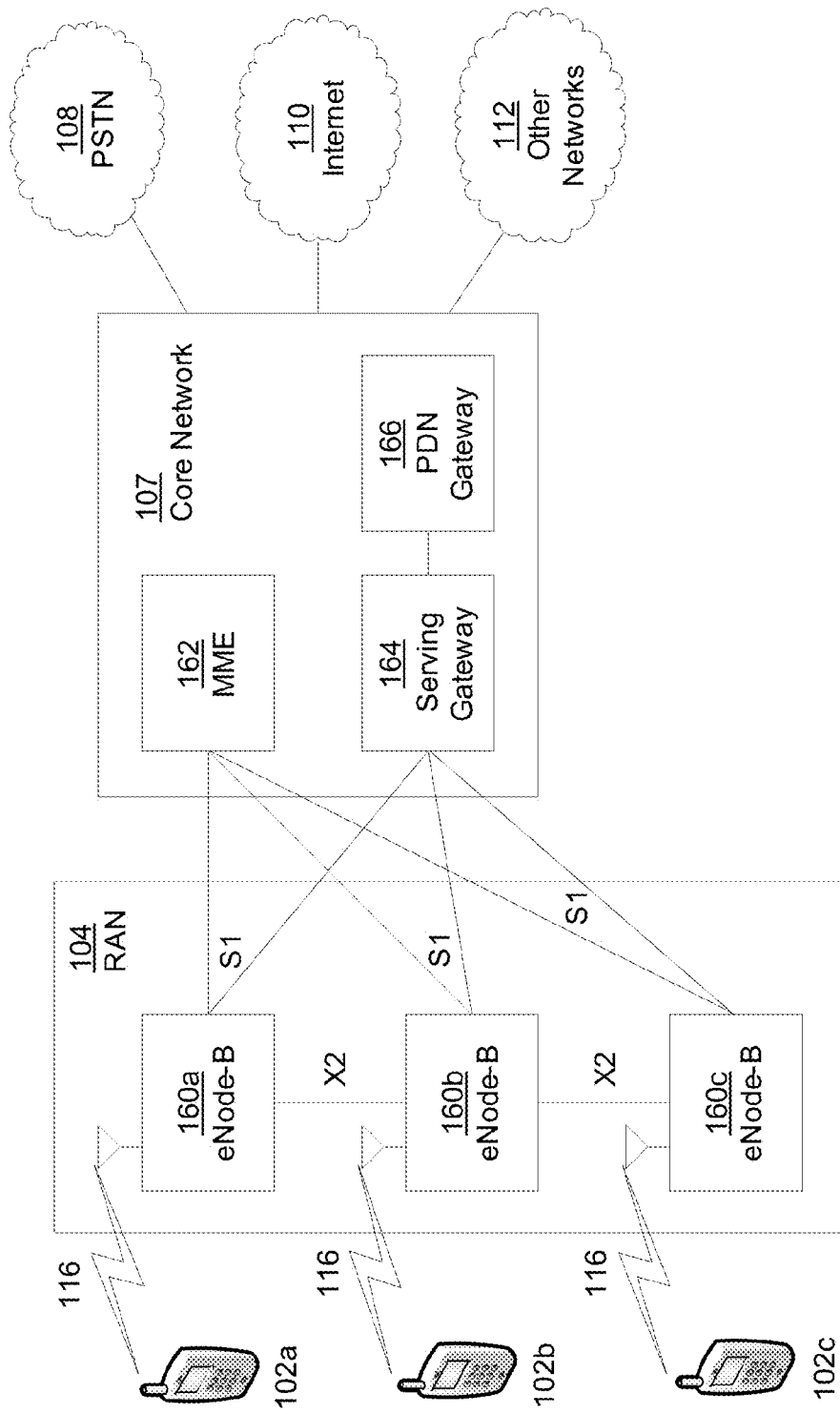
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
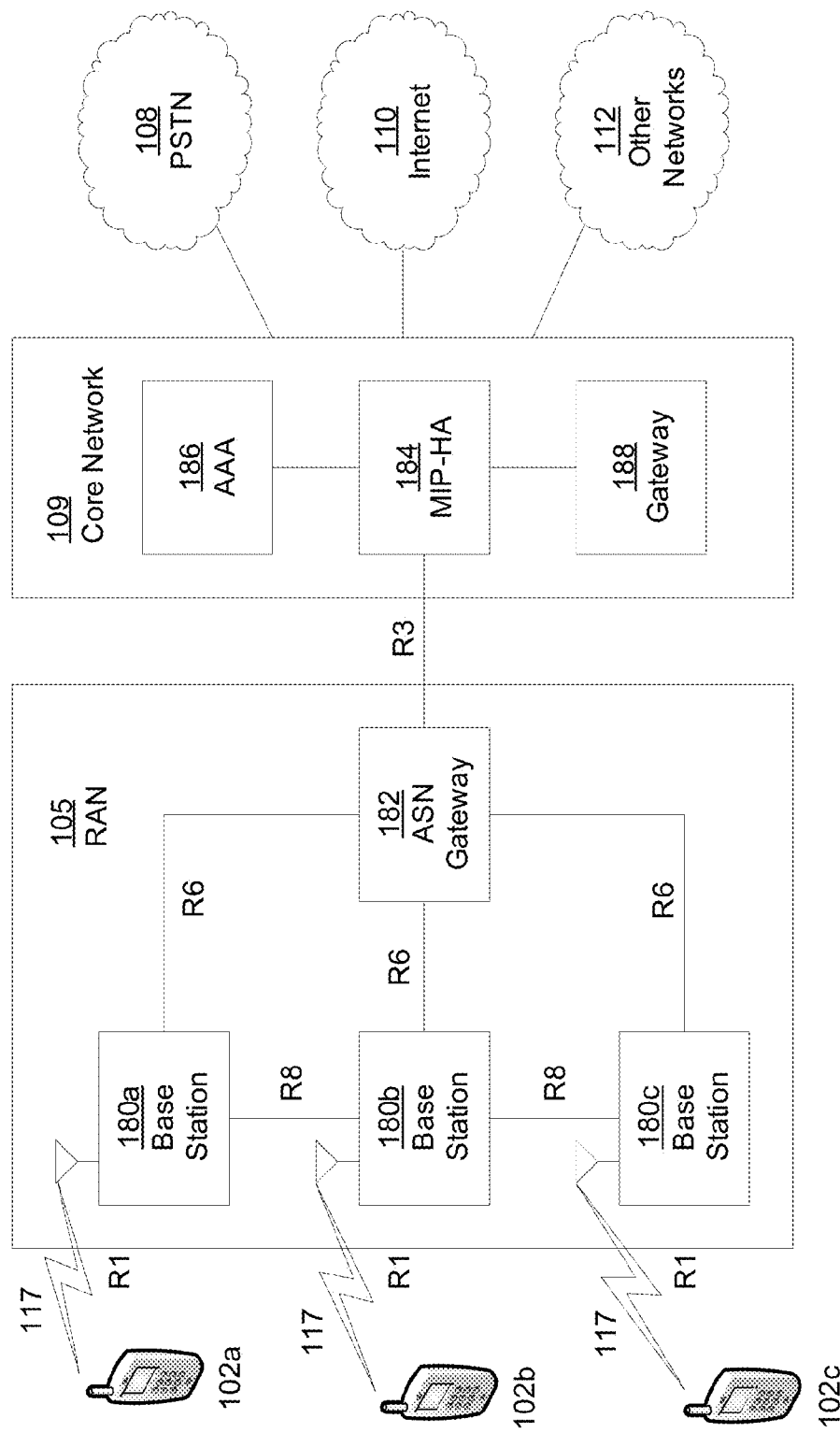
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments recognize that with the accelerated adoption of smart phones capable of generating and displaying video, efficiently and effectively transporting video across advanced communication systems may continue to grow. Transporting video data may result in intensive use of network resources, may be intolerance of certain loss of data, and may have (e.g., in the case of video conferencing) stringent latency requirements. In some applications (e.g., in the case of video conferencing) the same video data may be delivered to multiple wireless transmit/receive units (WTRUs).

Embodiments contemplate that in a limited resource wireless communication system, perhaps where the same video content may be delivered to multiple users, among other scenarios, broadcasting or multicasting point to multi point (PTM or ptm) may be an efficient way of delivering the video with minimal resource allocation. For example, the video content may have been transmitted over a single resource allocation and might not be replicated for one or more, or each, user. For example, the video data may be sent once using point to multi point transmission via the wireless DL group SCH using a UEgroup (e.g., WTRUgroup). Perhaps in order to maintain at least a minimum video quality for one or more, or each, of the WTRUs, among other reasons, the data transmission over the point to multipoint DL SCH may be enforced using common hybrid automatic repeat request (HARQ) unit over point to multipoint or point to point DL-SCH.

Embodiments recognize that a difficulty when using wireless multicasting ptm may be that within the cell region the different users may experience different signal quality, perhaps due to their different distance from the base station and/or different wireless channel. LTE wireless systems may use raptor codes in higher layers to improve the broadcast experience for the users within the call region. However, such a technique may lead to a large latency introduced by the raptor codes. In wireless communication systems, HARQ may be utilized to correct errors and/or to accommodate the fast changing wireless channel conditions in order to maintain a desired QoS with less (e.g., relatively very small) additional latency. Using HARQ with multicasting ptm transmission may raise an issue of inefficiency. For example when one or more of the users experience low performance and request retransmission, the entire broadcast band allocation of the broadcast users may be used for the retransmission.

Scalable video coding (SVC) may be a video coding technique that may be utilized to produce a compressed bit stream. The compressed bit stream may include a number of sub-bit streams with a reduced spatial and/or temporal resolution. For example, the SVC design may provide scalability at a bit-stream level. In some embodiments, bit-streams for a reduced spatial and/or temporal resolution may be obtained by discarding network abstraction layer (NAL) units (e.g., or network packets) from a global SVC bit-stream that might not be used for decoding the target resolution. NAL units of progressive refinement (PR) slices may be truncated, perhaps in order to further reduce the bit-rate and/or the associated reconstruction quality, among other reasons.

In some embodiments, perhaps using SVC coding technique, the video server may generate a set of bits streams, and one or more of the bit streams may correspond to different SVC layers. The SVC layers may be assigned to a different Evolved Packet System (EPS) barrier to be delivered via the LTE system with one or more different quality of service (QoS) class priority levels. The SVC layers (e.g., layer 1—base layer, layer 2—enhanced layer 1, layer 3—enhanced layer 2 . . . ) may be assigned into EPS barriers, perhaps in some embodiments with decreasing QoS priority order.

The differentiation of the SVC layers with different importance (e.g., QoS) priorities may be performed within a unicast channel that may deliver a part of the layers, for example according to the transmission rate that may be allowed by the wireless channel and/or multi users scheduling. In some embodiments, the differentiation of the SVC layers with different importance (e.g., QoS) priorities may be performed using multicast point to multipoint transmission, for example where the multicast shared channel may include multiple logical channels delivering the different layers of SVC assigned with different priorities to multiple users with different performance levels. In multicast mode, users with a low signal-to-noise ratio (SNR) may dictate the throughput of the multicast channel, which in some embodiments may be the throughput that one or more, or every, UE may achieve (e.g., a UE or UEs that may be relatively more difficult to reach than other UEs—such as a UE that may have the least favorable channel condition(s) or a "least common denominator UE", etc.). In some embodiments, one of the UEs in the multicast group may be chosen as a reference UE that may be used for deciding the amount of information to be sent on the multicast channel, among other scenarios. The choice of the reference UE may be based on one or more factors, such as but not limited to: the signal quality reported by the UEs (e.g., RSRP, RSRQ, CQI); the uplink channel quality measured for the UEs; the location of the UE; a heuristic (for e.g., average) measurements received from one or more UEs in the multicast group; a heuristic (for e.g., average) of uplink measurements of a set of UEs; and/or the number of retransmissions requested by UEs in the set.

In some embodiments, packets assigned to high priority QoS (e.g., SVC base layer) may be protected using HARQ and/or may consume most of the allowed delay. In an example, low priority logical channels may be discarded due to delivery timeout.

Figure 2:
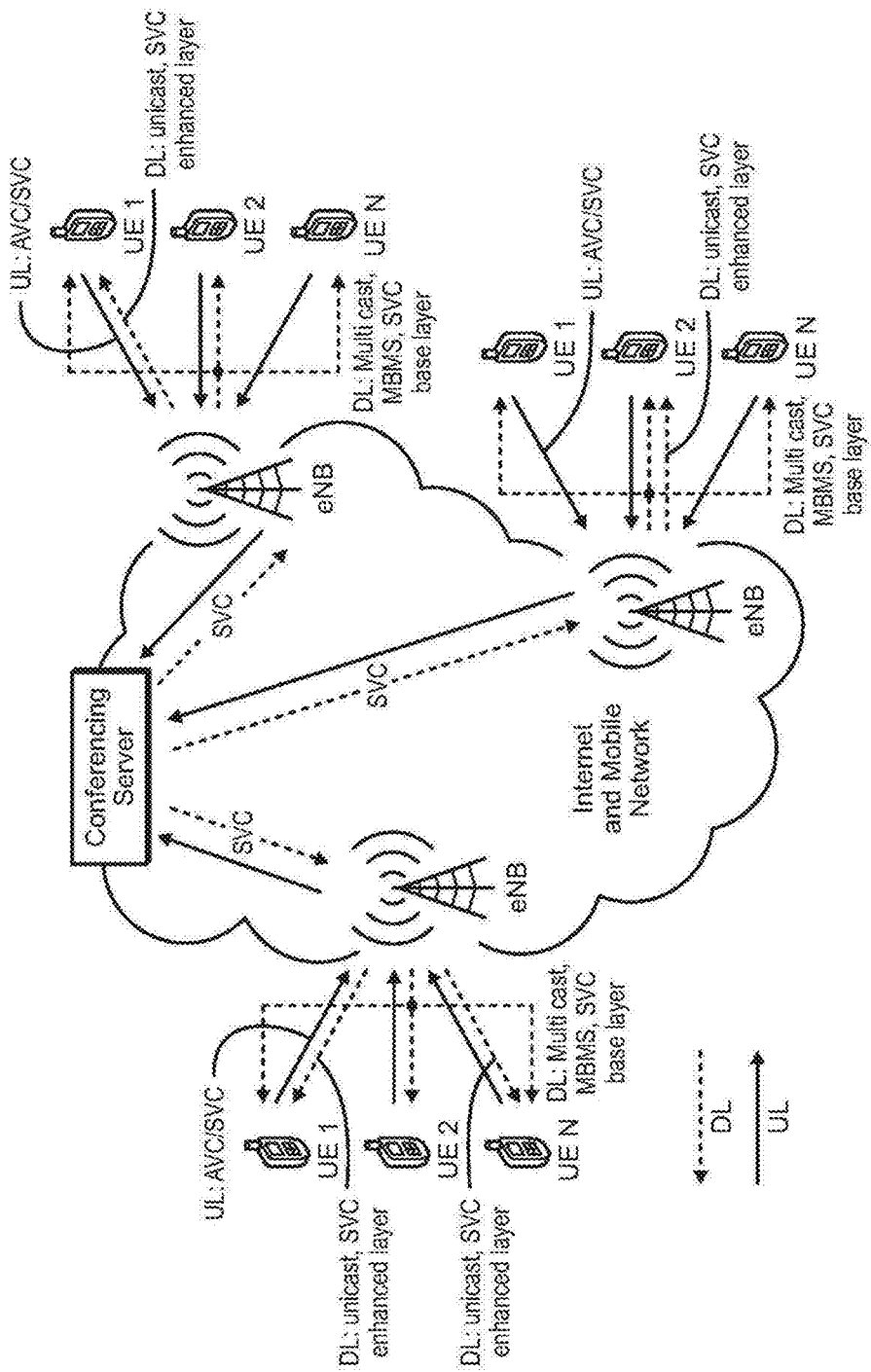
FIG. 2 illustrates an example video conferencing architecture with simultaneous unicast/multicast shared channel operation consistent with embodiments.

In some embodiments, the SVC layers may be differentiated using a simultaneous (e.g. parallel and/or substantially simultaneously) unicast/multicast shared channel, where the SVC base layer may be sent over the multicast channel and/or enhanced layers may be sent over the unicast channel. The unicast and multicast shared channels may be transmitted to a WTRU in the same transmission time interval (TTI), for example using a concept similar to carrier aggregation where multiple transport blocks (e.g., two transport blocks (TBs)) may be generated in the MAC layer and/or may be allocated by the eNB scheduler to different frequencies in a single TTI. The logical channels may correspond to SVC layers with different priorities and/or may be mapped by the scheduler to the different TBs and/or transmitted via the unicast or multicast shared channel. For example, FIG. 2 illustrates an example video conferencing architecture with simultaneous (e.g. parallel) unicast/multicast shared channel operation.

Figure 3:
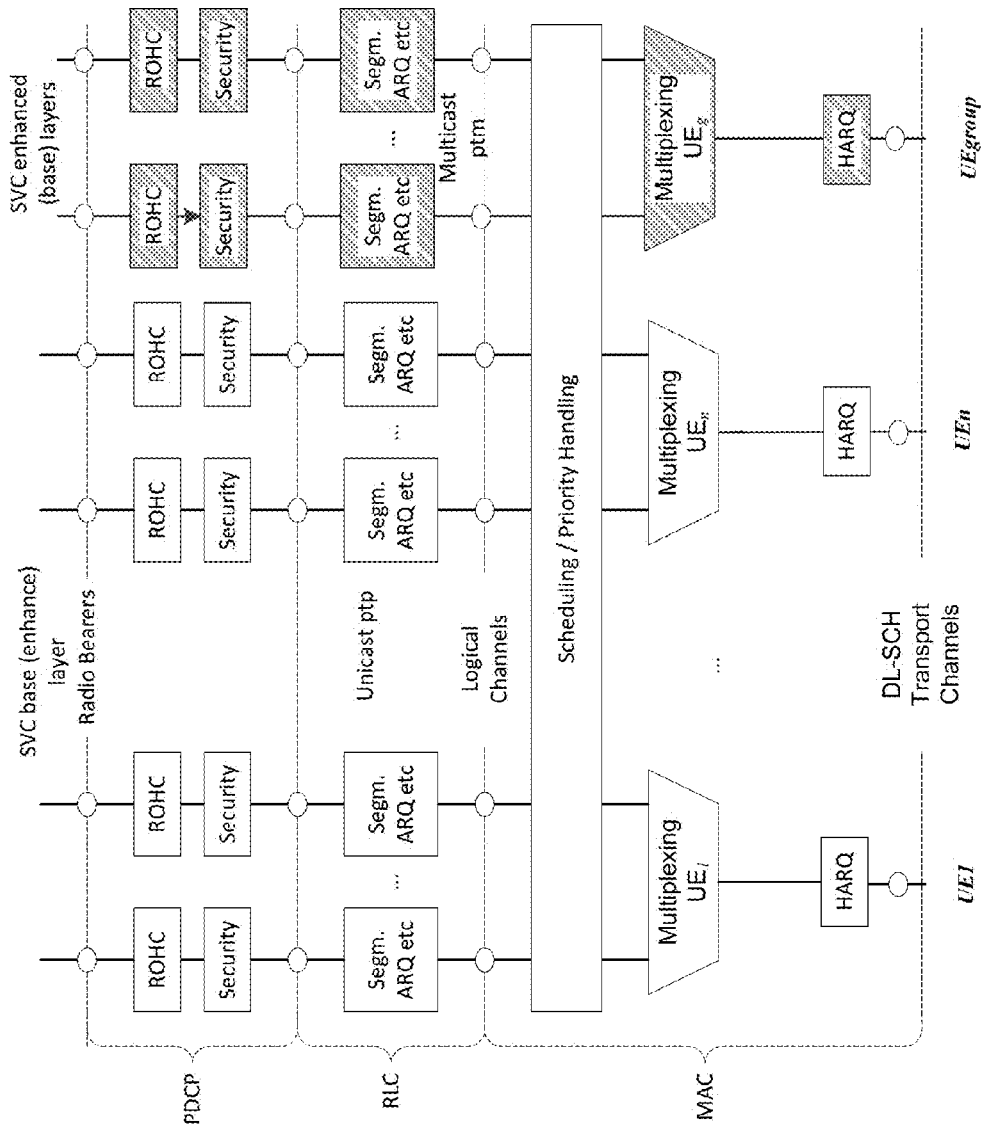
FIG. 3 illustrates an example Layer 2 structure for the downlink with a separate HARQ unit for a multicast channel consistent with embodiments.

One or more embodiments contemplate an LTE Layer 2 structure that may be configured to be utilized for simultaneous (e.g. parallel) unicast/multicast. In LTE, in the uplink and/or the downlink a transport block (e.g., a single transport block) per user may be generated per TTI in the absence of spatial multiplexing. Perhaps in order to achieve simultaneous (e.g. parallel) operation of unicast and multicast, among other reasons, for example in the same TTI, the Layer 2 structure may be changed. For example, the Layer 2 structure may be changed to accommodate support for additional multiplexing of UEgroups and/or HARQ for UEgroups. FIG. 3 illustrates an example Layer 2 structure for the downlink with a separate HARQ unit for a multicast channel. The shaded elements may correspond to a HARQ entity for HARQ for a UE group.

For example, as shown in FIG. 3, a WTRU may be assigned a specific UEi transport channel and/or a UEgroup transport channel (e.g., the shaded elements). One or more, or each WTRU may possess a cell radio network temporary identifier (C-RNTI), which may be a unique identification used for identifying RRC Connection and/or scheduling information. In an example, the WTRU may also be identified by the group-RNTI (G-RNTI) that may be assigned to the UEgroup. The MAC layer functionality may include multiplexing of MAC service data units (SDUs) belonging to one or more logical channels into transport blocks (TB) that may be delivered to the physical layer on transport channels for transmission to the group of WTRUs identified by UEgroup. In one or more embodiments as described herein, a wireless transmit/receive unit (WTRU) may be a user equipment (UE), or vice versa.

Figure 4:
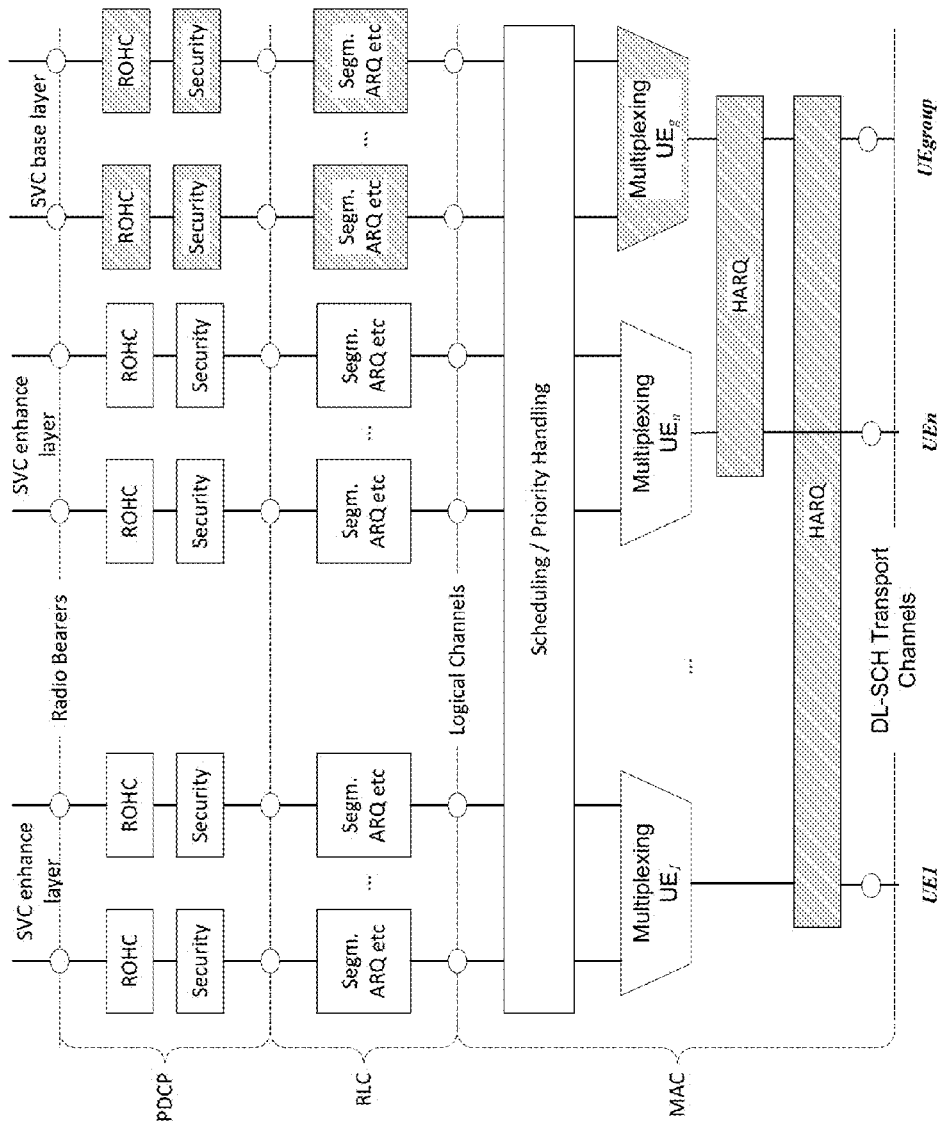
FIG. 4 illustrates an example Layer 2 structure for simultaneous unicast/multicast with common a HARQ unit consistent with embodiments.

One or more embodiments contemplate an LTE Layer 2 structure that may be configured to use a common HARQ unit. For example, the HARQ unit of a unicast assigned to an individual UEi may be shared with the HARQ unit assigned to a UEgroup. For example, the common HARQ unit may be configured to schedule retransmissions of TBs that may include a detected error that may be received on at least one of the transport channels to a different transport channel for the retransmission. For example, a TB with a detected error may be originally transmitted via a UEgroup transport channel and/or may be retransmitted via UEi transport channel (e.g., and vice versa). Changing the transport channel used for retransmission may be used for common HARQ between unicast and multicast transport channels. Embodiments recognize that since a TB that may be transmitted via the multicast channel may fail to be received by a single WTRU (e.g., while other WTRUs may receive the transmission correctly), it may be inefficient in terms of system capacity to perform the retransmission over the multicast channel. In some embodiments, perhaps if a certain WTRU may have been scheduled to receive TBs from a UEi (e.g., an unicast message) and/or UEg (e.g., a multicast message) but might have been unable to correctly receive the transmission sent on a transport channel from the UEgroup, among other scenarios, the WTRU may be scheduled for retransmission of the TB (e.g., using the common UEi/UEg HARQ unit). The retransmission may be sent via the UEi transport channel (e.g., rather than and/or in addition to using the original UEg transport channel). FIG. 4 illustrates an example Layer 2 structure for simultaneous (e.g., parallel) Unicast/multicast with common a HARQ unit.

In some embodiments, perhaps in order to implement the common HARQ unit, among other reasons, the number of supported HARQ processes may be doubled (e.g., from 8 to 16), for example to allow retransmission of a TB originated on one or both transport channels that may belong to the common HARQ. In some embodiments, the common HARQ unit may be allowed to retransmit from a transport channel (e.g., a single transport channel, perhaps either UEi or UEgroup). In some embodiments, allowing retransmission for a single transport channel may provide simplified common HARQ unit operation that may be particularly suitable for the case where the two transport channels assigned to UEj and UEgroup may be used to carry information with different priority level. For example, such a scheme may be applied in scenarios of SVC, where the transport channel that may be assigned to a UEgroup may carry the base layer packets while the transport channel assigned to UEj may be carrying the enhance layers SVC. Perhaps when UEj may fail to receive the transport block assigned to UEgroup and/or the transport block assign to UEj, among other scenarios, the retransmission of the combined HARQ unit (e.g., assigned to UEj and UEgroup) may retransmit the transport block from UEgroup since it may carry the base layer SVC with higher importance over the enhance layer TB generated by the transport channel assigned to UEj.

Figure 5:
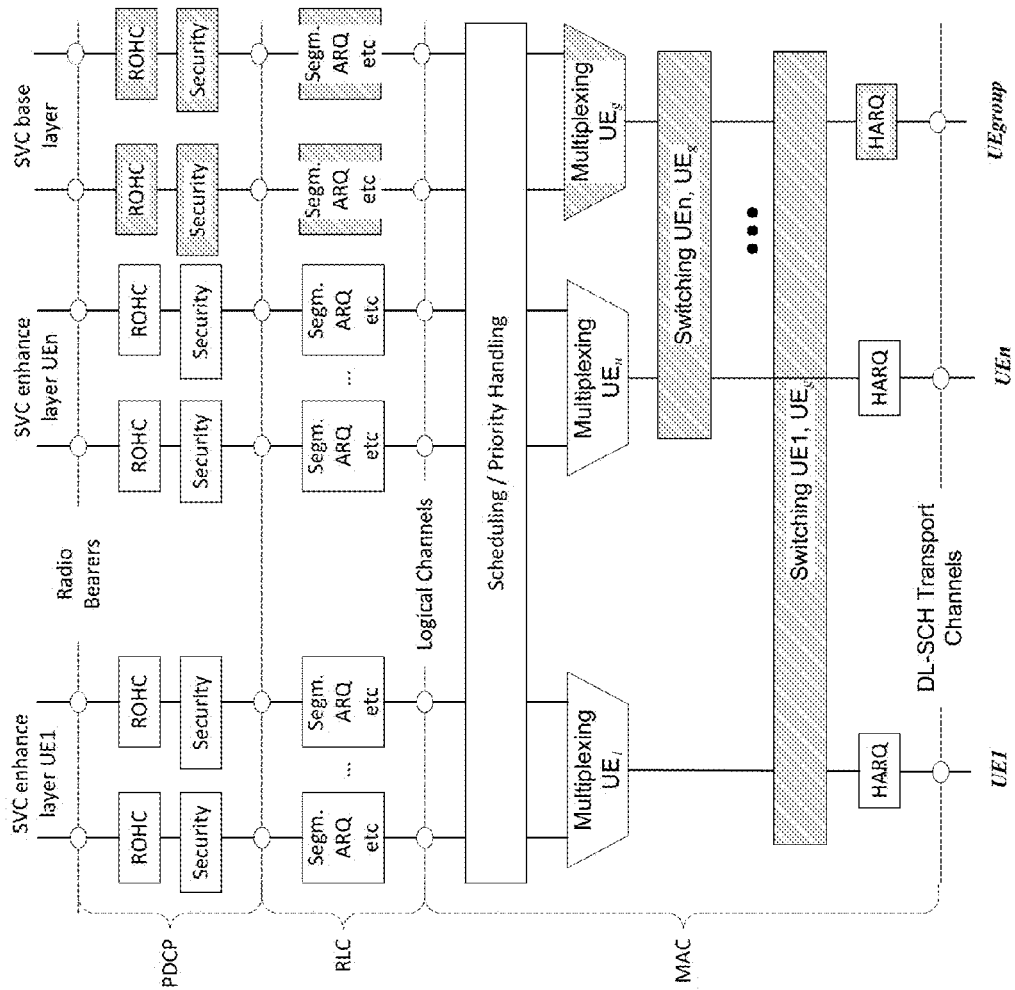
FIG. 5 illustrates an example architecture for a Layer 2 structure for the downlink with a spate HARQ unit for a multicast channel with a multicast/unicast switching capability consistent with embodiments.

One or more embodiments contemplate an LTE Layer 2 structure with separate HARQ units that may be configured to perform multicast/unicast switching. For example, perhaps to simplify the operation of common HARQ, among other reasons, separate HARQ units may be used for unicast (e.g., UEi) and multicast (e.g., UEgroup). Switching the MAC PDU between transport multicast (e.g., UEgroup) and unicast (e.g., UEi) may be performed, for example using a Switching UEi, UEgroup block. The switching block may direct the MAC PDU generated from UEg multiplexer to UEi HARQ unit to be transmitted on the UEi transport channel. When the MAC PDU may be switched from UEgroup to UEi (or vice versa), the new (e.g., fresh or updated) transmission indicator may be toggled and may be included in a PDCCH transmission to indicate a new (e.g., fresh or updated) TB transmission. The WTRU that may receive the transport block after switching from multicast transport channel to unicast transport channel may handle the corresponding transport block as a new (e.g., fresh or updated) transmission, for example disregarding the previous transmissions. Generating a new (e.g., fresh or updated) transmission indicator one or more times, or every time, or nearly every time, switching may occur between multicast to unicast may allow the network to maintain the current definition of the HARQ units without modification. FIG. 5 illustrates an example architecture for a Layer 2 structure for the downlink with a separate HARQ unit for a multicast channel with a multicast/unicast switching capability (e.g., a multicast/unicast switching function or entity).

Embodiments contemplate one or more techniques for utilizing the existing LTE Layer 2 structure to support simultaneous (e.g., parallel) multicast/unicast. In some embodiments, the existing Layer 2 structure may be configured to allocate a single downlink shared channel (DL-SCH) transport channel for one or more, or each WTRU. In some embodiments, perhaps in order to support simultaneous (e.g., parallel) multicast/unicast within the DL-SCH transport channels, among other reasons, a single transport channel may be allocated for DL-SCH multicast and other DL-SCH transport channels may be allocated as unicast serving, for example to serve connected WTRUs.

In some embodiments, the selection of the DL-SCH UEi transport channel to be allocated for multicasting may be performed by the eNB scheduler. The selection may be based on criteria such as, but not limited to, locating the WTRU with the relatively best/highest multicast channel performance among the WTRUs participating in the group. Perhaps once the DL-SCH UEi has been selected, among other scenarios, the eNB may notify one or more WTRUs that may be participating in a group of the C-RNTI of the WTRU selected for multicasting. The other WTRUs may use the C-RNTI to decode the multicast control channel, perhaps in order to identify resource allocations for the multicast transport channel and/or to detect the TB received over that transport channel. In some embodiments, the multicast transmission over the selected transport channel for multicasting may be similar to any other unicast transmission. In some embodiments, the multicast UEi with its C-RNTI allocated to it may be unaware that the transmission is multicast to other WTRUs as well.

In some embodiments, perhaps while the wireless channel may be changing, among other scenarios, the reallocation of the multicast channel may be performed, for example by notifying the WTRUs in the group that a new C-RNTI (e.g., that may belong to another WTRU from the group) may be used as the multicast channel. In an example, the WTRU selected for multicasting may be prevented from operating in dual transport channel mode (e.g., both unicast and multicast), receiving the multicast channel on its C-RNTI.

In some embodiments, perhaps for SVC delivery, among other scenarios, utilizing a C-RNTI of one of the WTRUs in the group as a de facto multicast channel may allow the SVC base layer to be transmitted over the multicast channel to a plurality of WTRUs with a relatively higher priority while the SVC enhance layers may be transmitted via the unicast channels with a relatively lower priority. In some embodiments, the lower priority unicast channel may be unavailable for the WTRU whose C-RNTi may be utilized to perform transmission of the multicast transport channel.

Figure 6:
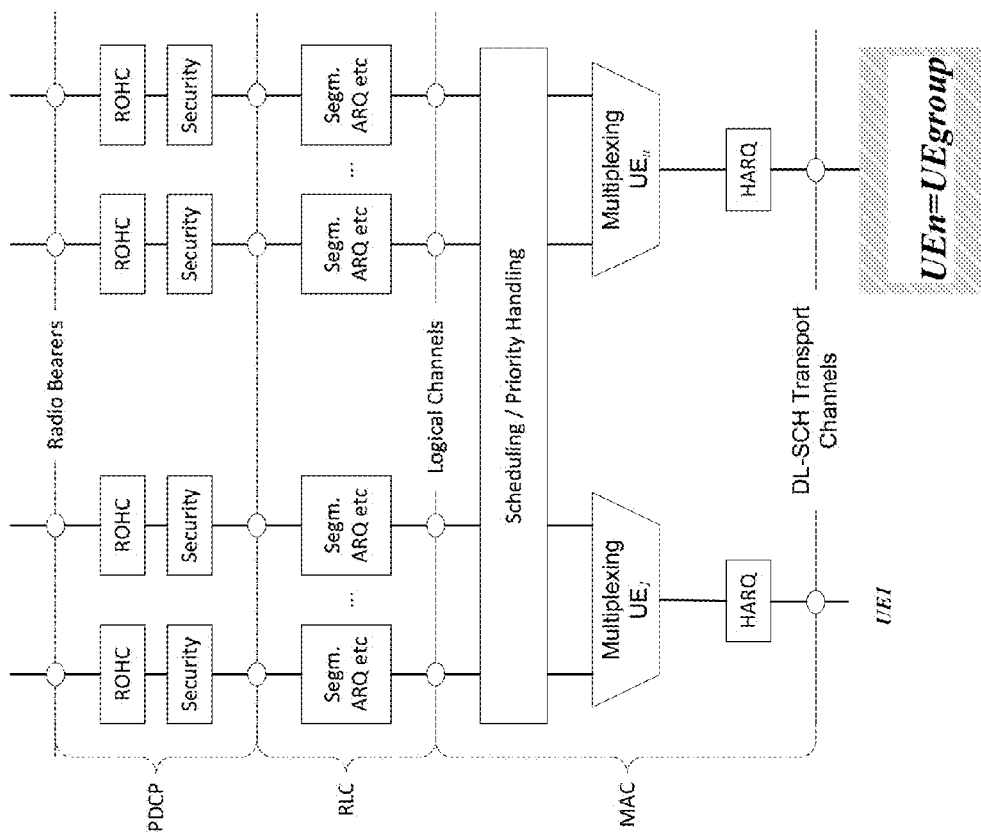
FIG. 6 illustrates an example Layer 2 structure for the downlink that may implement techniques for utilizing the existing LTE Layer 2 structure to support simultaneous multicast/unicast consistent with embodiments.

Some embodiments recognize that utilizing a C-RNTI of one of the WTRUs of the group for multicast messaging might or might not support common HARQ as described if the LTE structure is to be maintained. Switching the WTRU that may be used to carry the multicast information (e.g., via its C-RNTI) may be implemented using RRC layer signaling and/or full synchronization between the RRC messaging. In some embodiments, data allocation into different logical channels may also be utilized. FIG. 6 illustrates an example Layer 2 structure for the downlink that may implement techniques for utilizing the existing LTE Layer 2 structure to support simultaneous (e.g., parallel) multicast/unicast.

Figure 7:
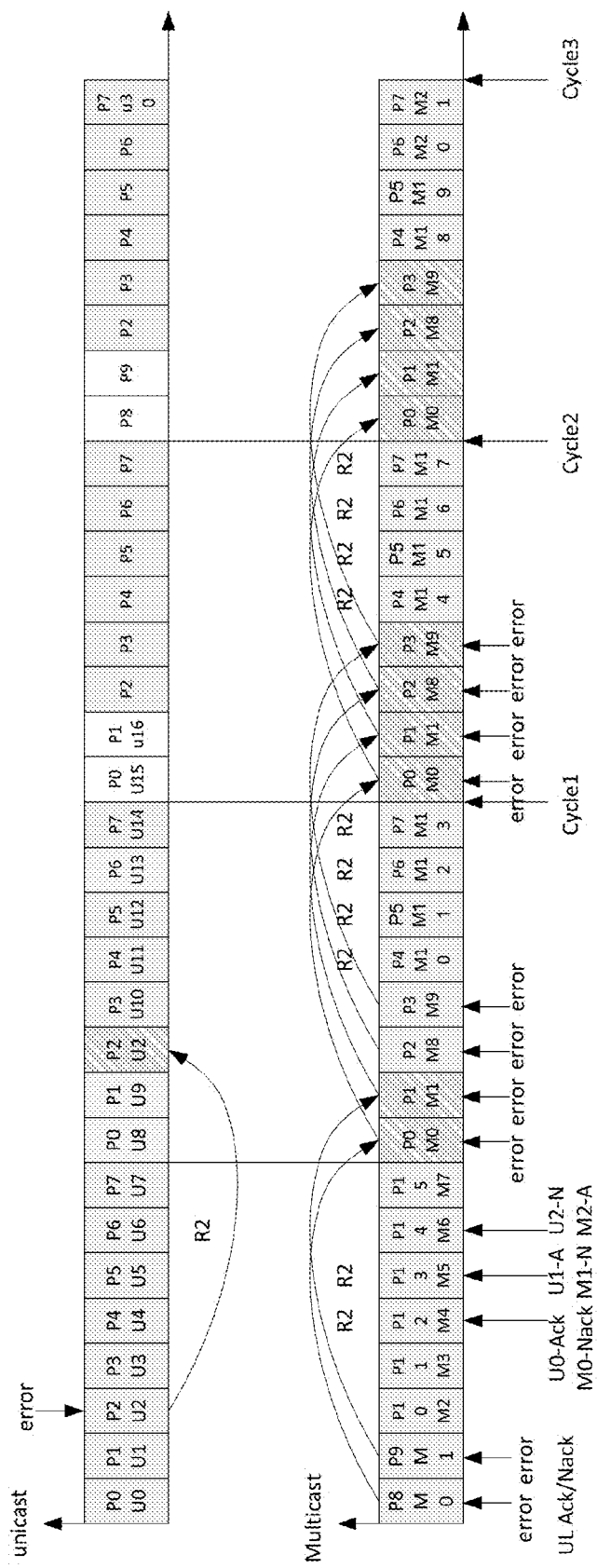
FIG. 7 illustrates an example of HARQ process timing for separate HARQ units consistent with embodiments.

Embodiments contemplate one or more techniques for HARQ handling different scenarios for simultaneous (e.g., parallel) unicast multicast messaging. In some embodiments, for the example where separate HARQ units may be utilized for multicast/unicast, HARQ handling of errors and/or retransmissions may be modified as compared to the standard LTE MAC sub layer definition. In some embodiments, for common HARQ unit handling procedures (e.g., a common HARQ entity handling unicast and multicast), HARQ handling of errors and/or retransmissions may be modified, for example to support the simultaneous (e.g., parallel) multicast/unicast. FIG. 7 illustrates an example of HARQ process timing for separate HARQ units. As illustrated in the example shown in FIG. 7, in some embodiments, the multicast channel may be overloaded with retransmissions due to serving multiple users.

Figure 8:
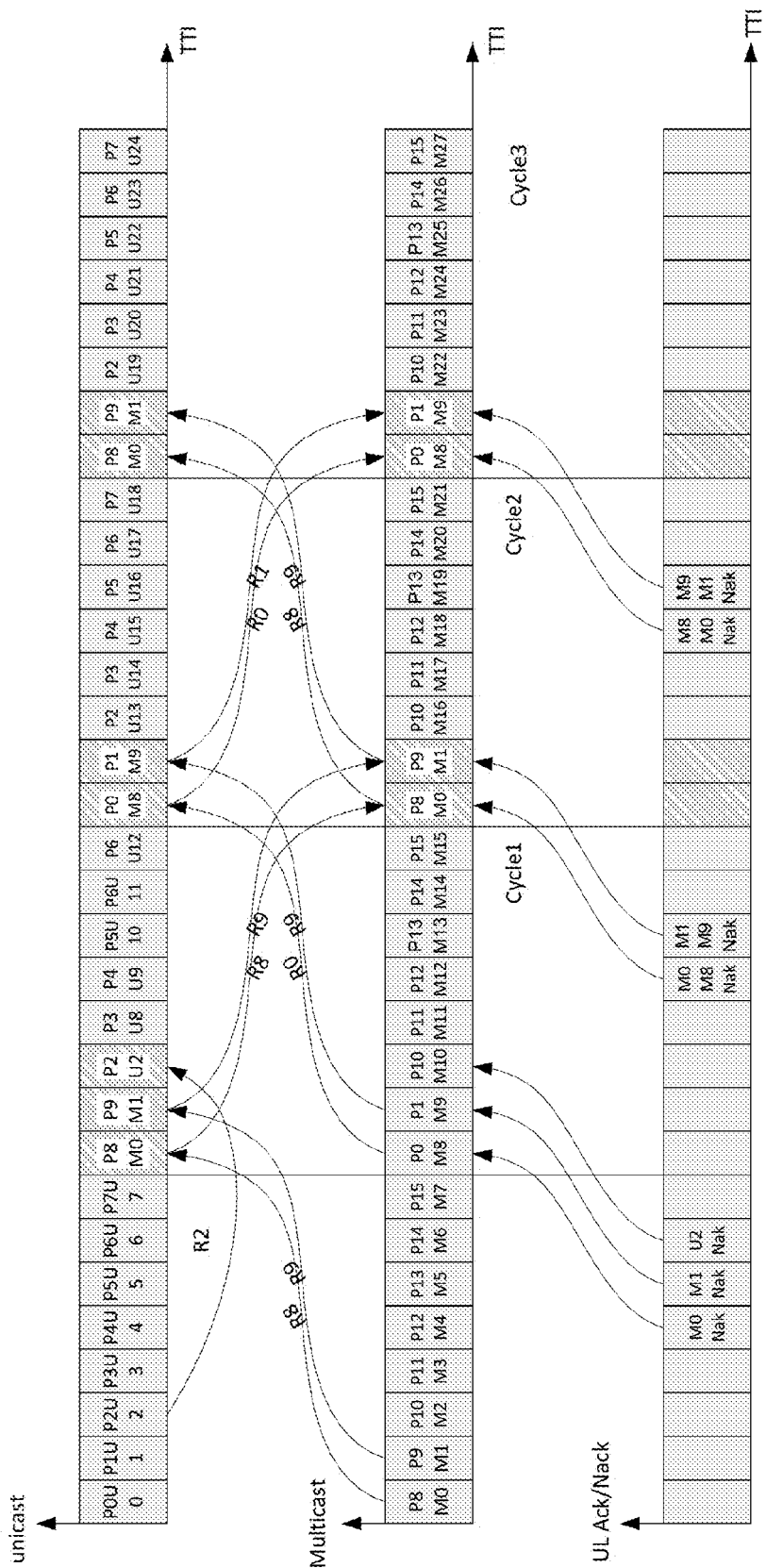
FIG. 8 illustrates the HARQ processes timing when an example common HARQ unit is utilized consistent with embodiments.
Figure 9:
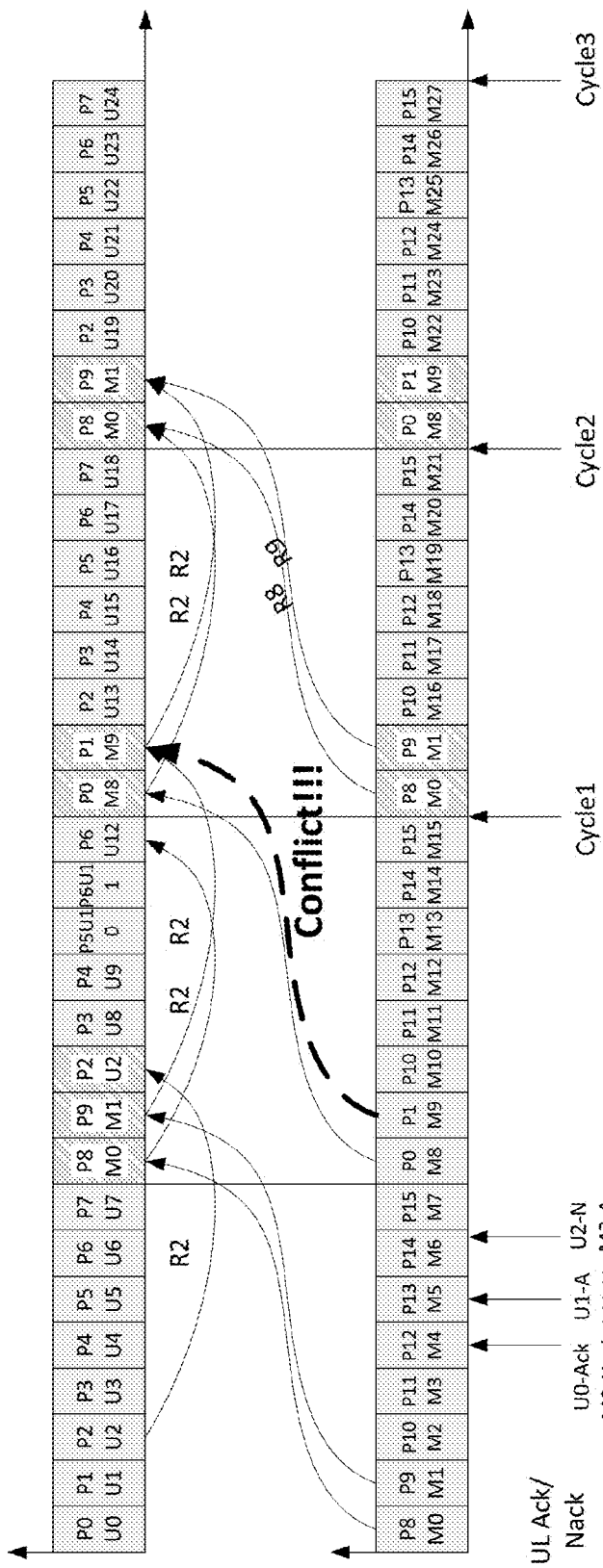
FIG. 9 illustrates an example of conflicts if one or more, or each, of the retransmissions is sent on the unicast channel consistent with embodiments.

FIG. 8 illustrates, for the same or similar error behavior as in FIG. 7, the HARQ processes timing when an example common HARQ unit may be utilized. As illustrated in the example shown in FIG. 8, the multicast channel may offload the first and/or the third retransmissions to the unicast channel. In this example, the second retransmission may still be performed over the multicast channel. Such scenarios may increase the throughput of the multicast channel that may serve multiple users simultaneously (e.g., in parallel). In some embodiments, offloading the second retransmission to the unicast channel in addition to the first and/or third retransmissions may generate a conflict between the second and the first retransmissions. FIG. 9 illustrates how a conflict may arise if one or more, or each, of the retransmissions may be sent on the unicast channel.

In some embodiments, the use of the dedicated (e.g., separate) HARQ unit for UEg transport channel (e.g., the multicast transport channel) may facilitate design simplification and/or maintenance, perhaps based on the principle that a HARQ unit (e.g., a single HARQ unit) may be utilized per transport channel in LTE. The probability of retransmission over the shared group transport channel allocated to UEg (e.g., UEgroup) may be determined. For example, in some embodiments, it may be assumed that N users may be assigned to the UEgroup, and one or more, or each, user i may have a probability of block error of Pbler(i) for the original transmission. In such scenarios, the probability of first retransmission over the shared channel transmitted to the group UEgroup (e.g., $Pg_{retran}$) may be expressed as:

$$Pg_{retran} = 1 - \prod_{i=1}^{N}(1 - P_{bler}(i)) \quad \text{Equation (1)}$$

In LTE, the typical probability of error per transport block on the shared channel may be approximately 0.1. In the example wherein the same transmission may be sent to one or more, or each, of the users that are members of the group, to assume same typical block error rate (BLER) the scheduler may assign a modulation and coding scheme (MCS) value for TBg transmission(s) that may result in a BLER of 0.1 of the worst user. The other users may have a lower or equal BLER. Such a scheme may be implemented by tracking one or more, or each, user feedback CQI and/or selecting the worst one to set the MCS for the entire group. In this case looking at the value of $Pg_{retran}$ as function of Pble(i), assuming Pble(i)<=0.1, the worst case scenario for $Pg_{retran}$ may occur when one or more, or each, of the users of the group may have the same (or substantially similar) probability of block error (e.g., Pble(i)=C=0.1 for i=1:N). In such scenarios, the probability of first retransmission over the shared channel transmitted to the group UEgroup (e.g., $Pg_{retran}$) may be expressed as:

$$Pg_{retran} = 1 - (1-C)^N \quad \text{Equation (2)}$$

Figure 10:
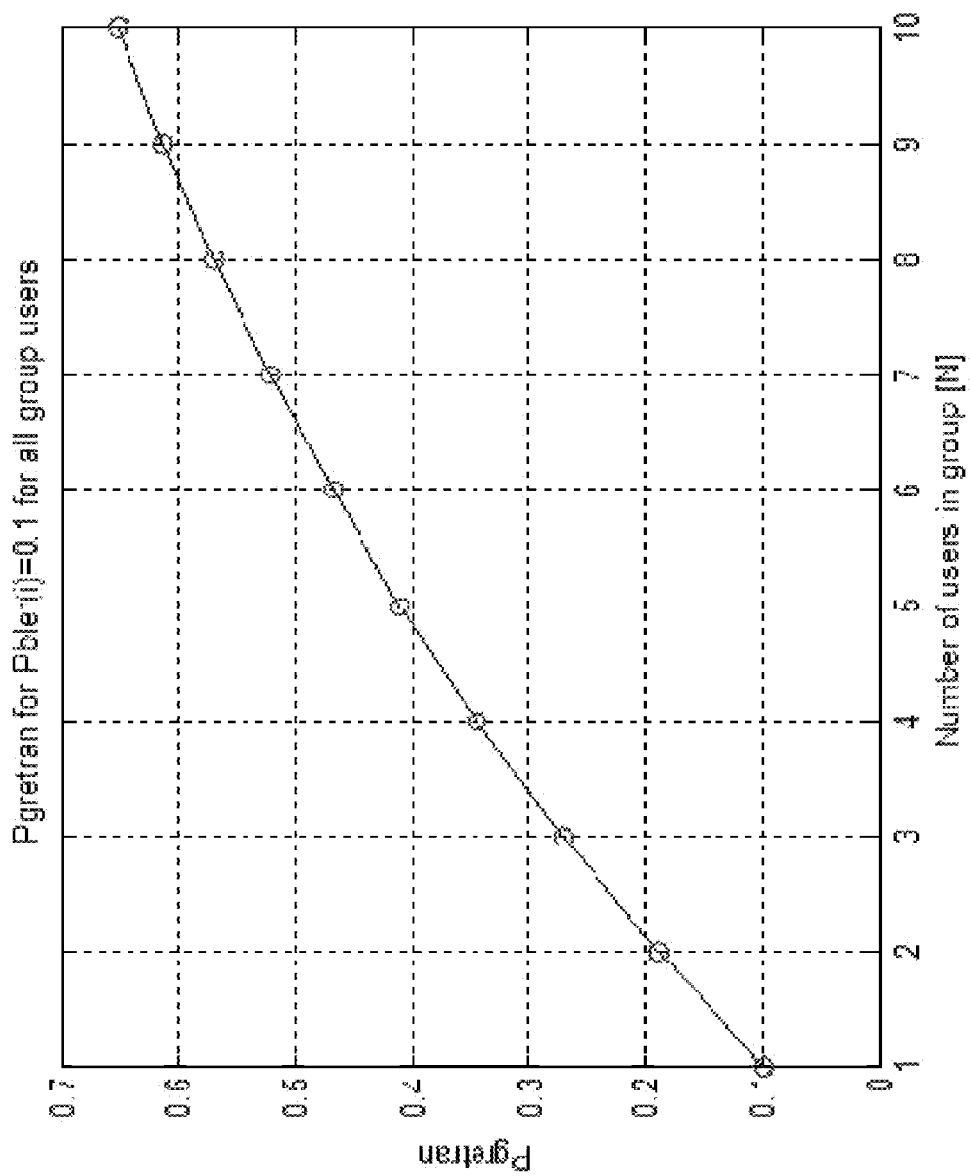
FIG. 10 illustrates an example graph showing of the probability for retransmission as a function of the number of users in the group consistent with embodiments.

FIG. 10 illustrates an example graph showing the probability for retransmission (e.g., $Pg_{retran}$) as a function of the number of users in the group (e.g., N). As illustrated in the example of FIG. 10, the probability of retransmission over the shared group transport channel may increase with an increased number of users in the group (e.g., N). In some embodiments, a worst case situation in terms of $Pg_{retran}$ may occur when the probability of block error rate of one or more, or each, of the group users may be equal and/or N may be (relatively) large. In some embodiments, the system may be busy performing retransmission a majority of the time. Some embodiments contemplate that such a scheme may reduce the efficiency of the transport channel.

Figure 11:
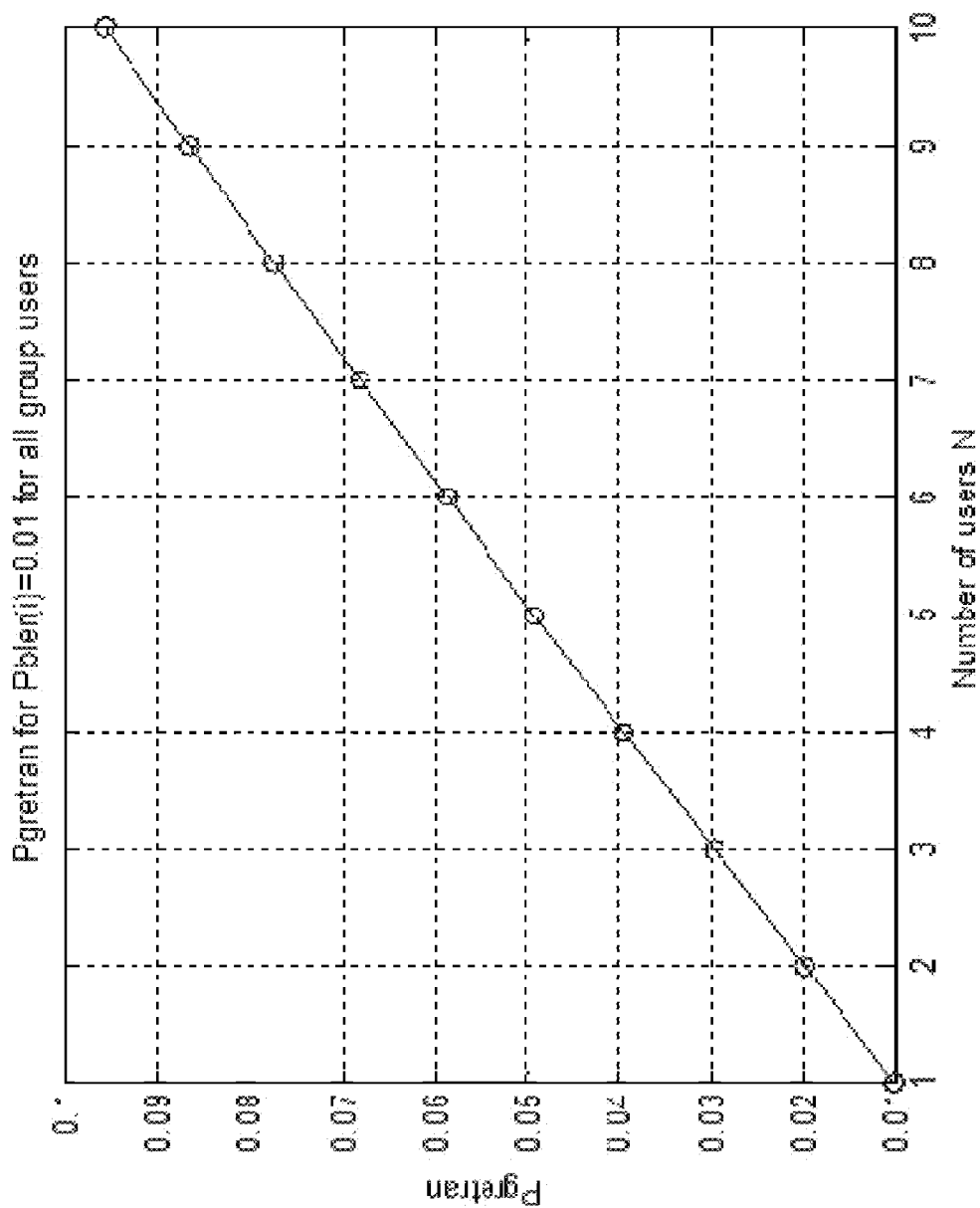
FIG. 11 illustrates an example graph showing of the probability for retransmission as a function of the number of users in the group when the first retransmission is offloaded to a unicast channel consistent with embodiments.

In some embodiments, using a common HARQ structure as described herein may offload the first retransmission from the multicast channel to the unicast channel. Offloading the first retransmission may reduce the probability $Pg_{retran}$ as illustrated in FIG. 11. For example, offloading the first retransmission may result in a $Pg_{retran}$=0.095 for N=10. Such a result may be obtained by assuming one or more, or each, of the users of the group may have a second retransmission probability of 0.01 on the multicast channel.

In some embodiments, perhaps in order to improve the retransmission probability, among other reasons, the scheduler in the eNB may be permitted to optimize the probability of $Pg_{retran}$, for example based on the scheduler's knowledge of SNR(i)→Pble(i) for one or more of the potential users in the group. For example, in order to reduce the retransmissions on the multicast channel, rather than (or in addition to) adjusting the MCS to achieve Pble=0.1 for the worst user over the shared transmission intended to the group, the MCS may be adjusted in order to satisfy certain desired $Pg_{retran}$.

In some embodiments, the scheduler may order the potential users in the group according to their SINR(i) (and/or SNR) in descending order, for example. For example, the user with a relative lowest SINR may be first and the user with a relative highest SINR may be last. The scheduler may select an MCS according to a user with lowest SINR in order to achieve Pble(1)~0.1. The scheduler may calculate the BLER for other potential group users. The scheduler may determine $Pg_{retran}$, for example according to Equation (1). If $Pg_{retran}$>$Pg_{retran\_target}$ (e.g., where $Pg_{retran\_target}$ may be a target probability), the scheduler may change the MCS to achieve $Pg_{retran}$~$Pg_{retran\_target}$ and/or reduce the number of users to (e.g., from N to M) to achieve $Pg_{retran}$~$Pg_{retran\_target}$. In some embodiments, the scheduler may use a less robust MCS, for example if $Pg_{retran}$>$Pg_{retran\_target}$, the scheduler may change MCS to achieve $Pg_{retran}$~$Pg_{retran\_target}$.

In some embodiments, the eNB may send the identity of group channels that may be in progress using different techniques including, but not limited to, one or more of system information, RRC dedicated messaging, MAC control element messaging, and/or the like.

Figure 12:
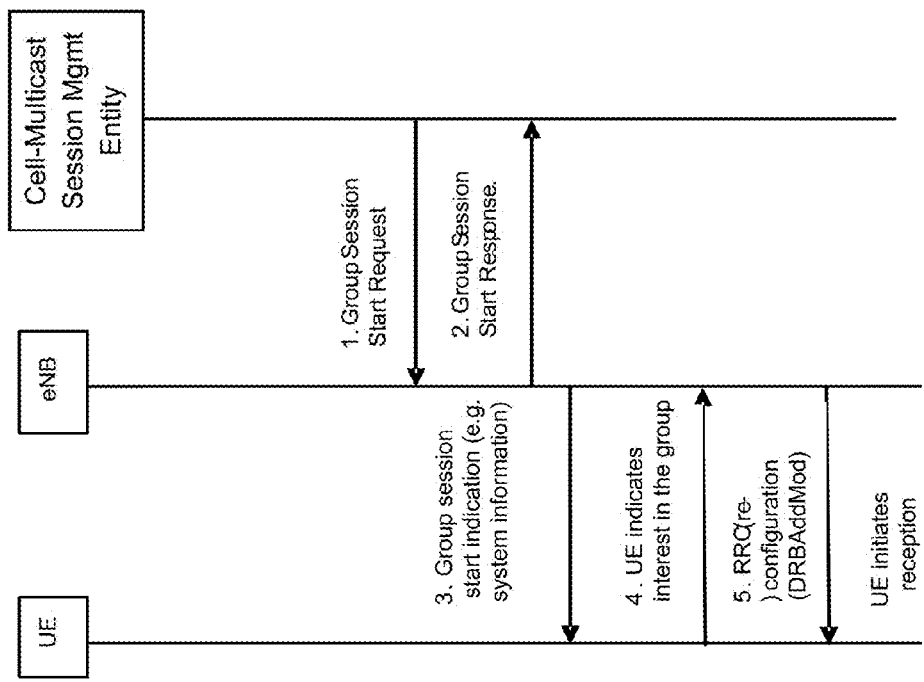
FIG. 12 illustrates an example messaging sequence for a WTRU to indicate to the network that it may desire to join an existing UEgroup consistent with embodiments.

In some embodiments, the WTRU may indicate to the network its preference to join an existing group channel. The indication may trigger the eNB to configure the corresponding logical channel for the WTRU. The WTRU may indicate to the network its interest in a specific service or a group of services using a notification. The notification may be a contemplated message and/or a modification of an existing message. The notification may be an RRC message, a non-access stratum (NAS) message, and/or the like. FIG. 12 illustrates an example messaging sequence for the WTRU to indicate to the network that it may desire to join an existing UEgroup. In the example shown in FIG. 12, the group channels may be configured through a logical entity referred to as a Session Management Entity (SME). The SME may initiate group sessions. In some embodiments, the SME may be collocated and/or interfaced to the multimedia broadcast multicast service (MBMS) coordination entity (MCE), for example as a correlated decision entity. In some embodiments, the group session may be initiated through MBMS and/or a cell-based multicast mechanism as described herein. The group session may be initiated based on factors including, but not limited to, one or more of operator input, radio link conditions, network capabilities, scope of service area, and/or the like.

In some embodiments, a WTRU configured for cell-multicast may receive a list/menu of available channels over existing broadcast mechanisms. For example, a WTRU configured for cell-multicast may receive a list/menu of available channels over one or more SIBs, dedicated messaging including paging, short message service (SMS), RRC/NAS dedicated signaling, and/or the like.

In some embodiments, common scheduling information may be signaled to each of the WTRUs that may be subscribed to a group. In some embodiments, one or more, or each, WTRU in the group may receive and/or be configured with a common group RNTI. In some embodiments, the eNB may maintain a list of C-RNTI(s) assigned to the WTRUs that may be subscribed to a particular group and/or may send common DCI information to one or more, or each, of the group members. In some embodiments, the common DCI information may be signaled to the group members individually using individual C-RNTIs.

In some embodiments, the WTRU may indicate an interest in a service class/group in a connection request message. For example, indicating the interest in a group in a connection request message may allow the network to configure the associated logical channel in the initial RRC configuration message.

In some embodiments, a particular service may be initiated as a unicast transmission in a cell. The eNB may maintain a count of WTRUs that may be interested in a particular service. In some embodiments, perhaps when the count of number of WTRUs may exceed a predetermined threshold, among other scenarios, the eNB may delete/remove the unicast logical channel and/or initiate a group based transmission. For example, the eNB may re-establish a removed unicast logical channel for multicast service.

Some embodiments recognize that traffic flow mapping configuration updates using RRC messages may be relatively a slow mechanism in terms of informing a WTRU/eNB of a configuration change. Perhaps in order to achieve more relatively rapid reconfigurations, one or more embodiments contemplate the definition of one or more MAC control element(s) (CEs). For example, a MAC CE may indicate the mapping of logical channel to group transport channel and/or unicast transport channel.

Figure 13:
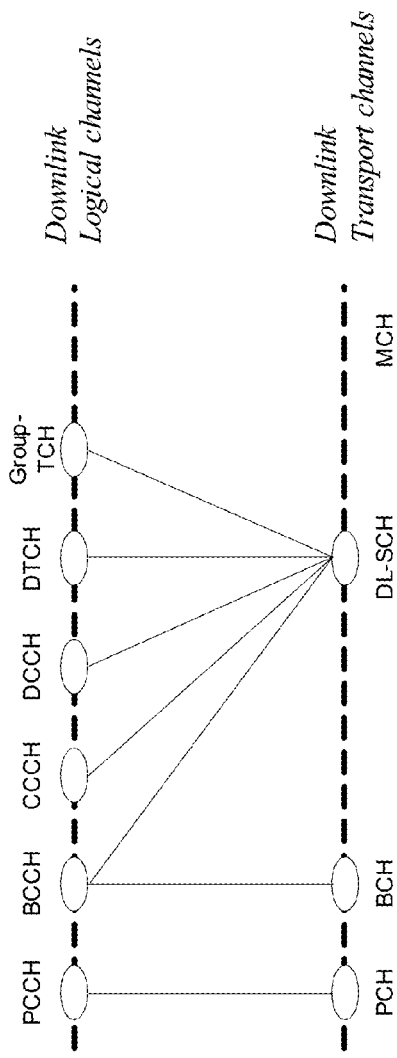
FIG. 13 illustrates an example of mapping a fresh point to multipoint downlink logical channel to a transport channel consistent with embodiments.
Figure 14:
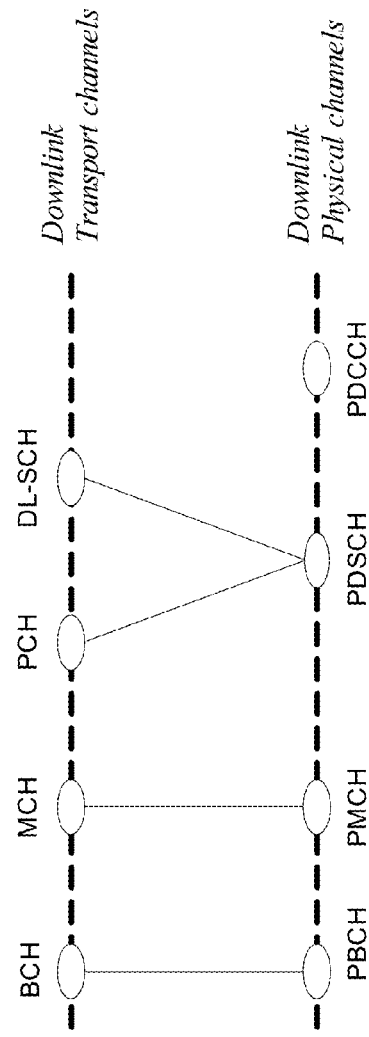
FIG. 14 illustrates an example mapping of transport channels to physical channels consistent with embodiments.

In some embodiments, the logical channel associated with the group radio bearer may be radio link control (RLC unacknowledged mode (UM)). For example, the group radio bearer may be mapped to a new (e.g., fresh or contemplated) point to multipoint downlink logical channel (e.g., Group-TCH) as illustrated in FIG. 13. The mapping from the transport channel to physical channel may remain the same, perhaps despite a change in the mapping of logical channels to transport channels to support cell multicast service. FIG. 14 illustrates a mapping of transport channels to physical channels.

In some embodiments, the configuration of cell multicast radio bearer(s) may be defined using RRC configuration, for example using the information element (IE) DRB-ToAddMod. The logical channel configuration may include parameters to configure the group logical channel. If a group RNTI may be used, in an example the group RNTI may be included in the configuration. An example of the DRB-ToAddMod IE is shown below in Table 1.

TABLE 1

| Example Information Element |
|---|

```
DRB-ToAddMod ::=   SEQUENCE {
    eps-BearerIdentity          INTEGER (0..15)         OPTIONAL,  -- Cond DRB-Setup
    drb-Identity                DRB-Identity,
    pdcp-Config                 PDCP-Config             OPTIONAL,  -- Cond PDCP
    rlc-Config                  RLC-Config              OPTIONAL,  -- Cond Setup
    logicalChannelIdentity      INTEGER (3..10)         OPTIONAL,  -- Cond DRB-Setup
    logicalChannelConfig        LogicalChennelConfig    OPTIONAL,  -- Cond Setup
    group-RNTI                  Group-RNTI              OPTIONAL,  -- Group RNTI
}
```

Figure 15:
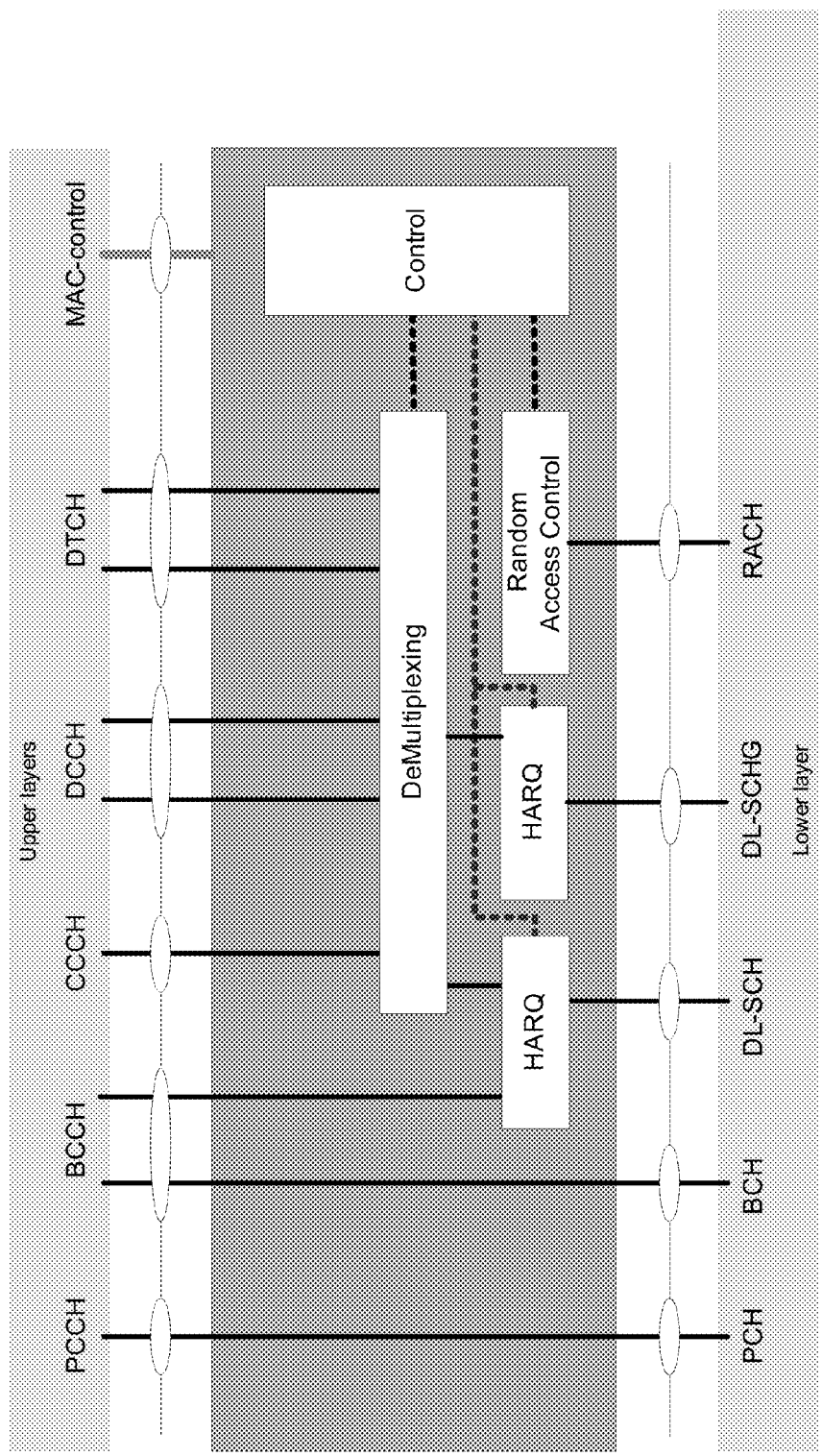
FIG. 15 illustrates an example MAC structure for a WTRU receiver with a dedicated HARQ unit consistent with embodiments.

Perhaps in order to support shared channel multicast with dedicated (e.g., separate) HARQ, among other reasons, one or more of the techniques described herein may be utilized. FIG. 15 illustrates an example MAC structure for a WTRU receiver with a dedicated (e.g., separate) HARQ unit.

In some embodiments, an eNB (and/or a WTRU) may add a MAC layer shared channel dedicated HARQ unit for group/multicast transmission. For example, the HARQ unit of the eNB may send HARQ information including a New Data Indicator (NDI), Transport Block (TB) size, HARQ process ID, and/or Redundancy Version (RV). In case of spatial multiplexing on DL-SCH, the HARQ information may include a set of NDI and/or TB size(s) for one or more, or each, transport block. In some embodiments, an eNB (and/or a WTRU) may add a group UE ID in addition to the dedicated UE ID. For example, in an RRC connection within the cell, one or more, or each, user may be identified by a C-RNTI. Perhaps in order to support multicasting transmission, among other reasons, a group-RNTI (G-RNTI) may be added in order to identify a group of users in an RRC connected cell. Perhaps, when a LTE network may establish a connection to the group of WTRUs over the DL SCH, among other scenarios, the eNB may assign to them the G-RNTI. Example RNTI values including the G-RNTI are shown in Table 2. Example RNTI values, their use, and their associated Transport Channels/Logical Channels are presented in Table 2.

TABLE 2

Example RNTIs

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| G-RNTI | Dynamically scheduled multicast transmission | DL-SCH | DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

In some embodiments, a WTRU (and/or an eNB) may add a second DL shared transport channel with dedicated HARQ unit for group/multicast reception. For example, the HARQ unit at the WTRU may receive HARQ information. The HARQ unit may perform soft combining with a saved previous transmission, for example based on the HARQ process ID and/or the Redundancy Version (RV).

In some embodiments, the WTRU (and/or eNB) may add uplink ack/nack feedback for the shared multicast HARQ unit. For example, one or more, or each WTRU identified within the group may send feedback ack/nack via the physical uplink shared channel (PUCCH) to an eNB to acknowledge reception of the TB that may be sent via the multicast shared channel. The HARQ feedback, perhaps in response to downlink data transmission, among other reasons, may include a single ack/nack bit per transport block. In case of simultaneous (e.g., parallel) transmission on both unicast shared channel and multicast shared channel, multiple ack/nack bits may be sent (e.g., a single ack/nack bit for each transport block).

In some embodiments, the WTRU (and/or eNB) may add feedback for shared multicast channel quality indication (CQI) information for one or more, or each, WTRU, for example in additional to the unicast CQI. The CQI may be sent from the WTRU to eNB to inform the eNB of operational performance. Perhaps when the WTRU may be allocated PUSCH resources in a subframe where a CQI report may be configured to be sent, among other scenarios, the CQI report may be transmitted together with uplink data on the PUSCH.

Figure 16:
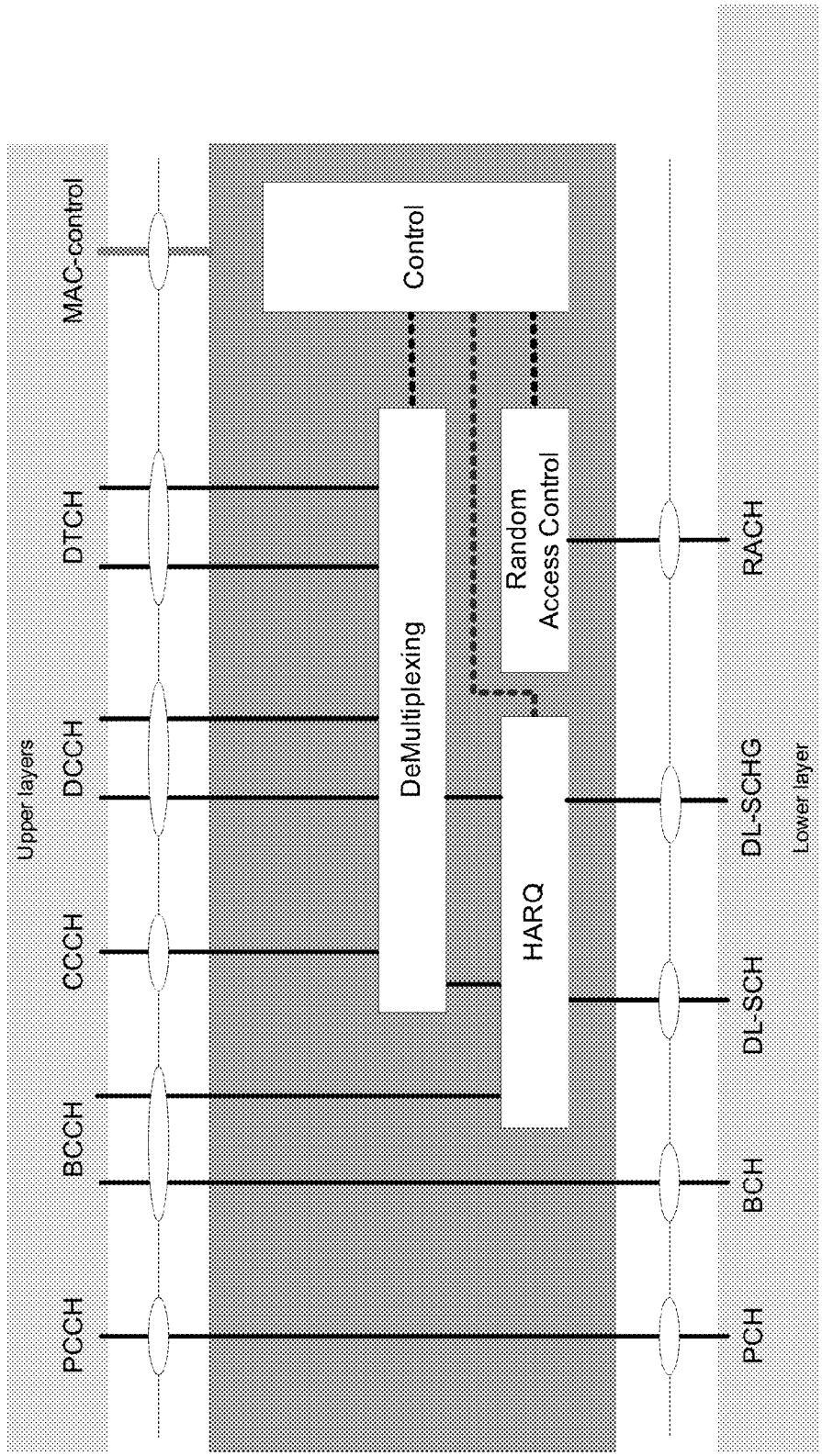
FIG. 16 illustrates an example MAC structure for a WTRU receiver with a common HARQ unit consistent with embodiments.

In some embodiments, perhaps in order to support shared channel multicast with common HARQ, among other reasons, one or more of the techniques described herein may be utilized. FIG. 16 illustrates an example MAC structure for a WTRU receiver with a common (e.g., shared) HARQ unit.

In some embodiments, an eNB (and/or a WTRU) may add a MAC layer shared channel dedicated HARQ unit for group/multicast transmission. For example, the HARQ unit of the eNB may send HARQ information including a New Data Indicator (NDI), Transport Block (TB) size, HARQ process ID, and/or Redundancy Version (RV). Perhaps in case of spatial multiplexing on DL-SCH, among other scenarios, the HARQ information may include a set of NDI and/or TB size(s) for one or more, or each, transport block.

In some embodiments, the eNB (and/or WTRU) may be configured to utilize a common HARQ unit, for example to direct unicast and/or multicast shared channels retransmissions via the unicast DL SCH transport channel. In an example, the common HARQ unit may include 16 HARQ processes rather than the 8 HARQ processes used in a dedicated e.g. separate) HARQ unit. Perhaps when one of the received transport channels (e.g., other than the worst WTRU multicast transport channel) may have an error, among other scenarios, the retransmission may take place on the unicast channel. In some embodiments, perhaps wherein the error may appear on both unicast and multicast shared channels, among other scenarios, the retransmissions may take place on one or more, or each of the unicast and multicast shared channels.

In some embodiments, perhaps when one of the received transport channels (e.g., other than the worst WTRU multicast transport channel) has an error, among other scenarios, the retransmission may take place on the unicast channel. In case the error may appear on both unicast and multicast shared channels, the retransmissions of the multicast channel may be performed over the multicast channel, and/or the unicast retransmission may be discarded. In some embodiments, such a decision to discard the unicast retransmission may be based on the fact that logical channels connected to unicast transmission may include enhanced layer SVC that may be less crucial for the video transmission.

In some embodiments, a WTRU (and/or an eNB) may add a second DL shared transport channel with a common HARQ unit for group/multicast reception. In some embodiments, the HARQ unit may receive HARQ information and/or may perform soft combining with its saved previous transmission(s), for exmaple based on HARQ process ID and/or Redundancy Version (RV). The original transmision and/or retransmission may be allocated on different transport channels. The eNB may indicate the original transmission (e.g., the channel used for the original transmission) as part of the HARQ process ID.

In some embodiments, a WTRU (and/or an eNB) may add uplink ack/nack feedback for the shared multicast HARQ unit. For example, one or more, or each, WTRU identified within the group may send feedback ack/nack via the PUCCH to eNB, perhaps in order to acknowledge reception of the TB that may be sent via the multicast shared channel, among other reasons. The HARQ feedback in response to downlink data transmission may include a single ack/nack bit per transport block. Perhaps in case of simultaneous (e.g., parallel) transmission on both the unicast shared channel and the multicast shared channel, among other scenarios, multiple ack/nack bits may be sent to acknowledge each of the received transport blocks.

In some embodiments, a WTRU (and/or an eNB) may add feedback for shared multicast CQI information for each WTRU in additional to the unicast CQI. The CQI may be sent from WTRU to eNB to inform the eNB of its operating performance. Perhaps when the WTRU may be allocated PUSCH resources in a subframe where a CQI report may be configured to be sent, among other scenarios, the CQI report may be transmitted together with uplink data on the PUSCH.

In some embodiments, perhaps for multicast over the DL-SCH, among other scenarios, a subset of multiple input multiple output (MIMO) modes may be supported. For example, in multicast a single transmission may be directed to one or more, or each, of the users in the group. In such scenarios, one or more MIMO modes that may be applicable for transmission to a specific user might not be applicable.

In some embodiments, MIMO modes that might not utilize feedback may be supported, but MIMO modes which utilize feedback might not be supported. In some embodiments, the MIMO modes that may be supported for the multicast channel may include one or more of single antenna port, transmit diversity, and/or open loop spatial multiplexing. In some embodiments, the WTRU and/or eNB may refrain from utilizing other MIMO modes that may utilize feedback.

Figure 17:
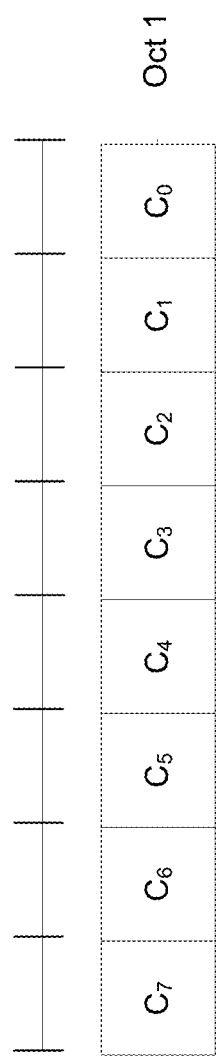
FIG. 17 illustrates an example Activation/Deactivation MAC control element that may be utilized in order to activate and/or deactivate one or more unicast and/or multicast channels consistent with embodiments.

Perhaps in order to optimize multicast performance, one or more embodiments contemplate a mechanism to enable/disable user participation in the multicast group. In some embodiments, perhaps since the group WTRUs may be performing simultaneous (e.g., parallel) unicast/multicast, among other scenarios, an activation/deactivation MAC CE may be utilized in order to activate and/or deactivate one or more unicast and/or multicast channels. FIG. 17 illustrates an example Activation/Deactivation MAC control element that may be utilized in order to activate and/or deactivate one or more unicast and/or multicast channels, among other reasons. In the example shown in FIG. 17, Bit 0 of the MAC control element (e.g., $C_0$) may be used for the activation/deactivation status of a WTRU participating in group multicast. Bit 1 of the MAC CE (e.g., $C_1$) may be used to activate/deavitate the WTRU's participation in a second group multicast channel, etc. The MAC control element may be sent via the unicast transport channel to indicate to UEj that it may activate/deactivate one or more multicast transport channel receivers.

In some embodiments, perhaps when an eNB determines to transition a WTRU from unicast to multicast or vice versa, among other scenarios, the logical channel may be reassigned from UEj to UEg. This may be accomplished by assigning the logical channel to both unicast and multicast. When multicast is active, the logical channel that includes the SVC may be served by the MAC multicast unit. While multicast is not activated, the logical channel may be served by the MAC unicast unit. In some embodiments, the logical channel may be configured as common between a multicast MAC unit and a unicast MAC unit.

In some embodiments, perhaps when simultaneous (e.g., parallel) unicast/multicast may be utilized over DL-SCH, among other scenarios, HARQ-ACK bits from unicast and/or multicast transmissions for one or more, or each WTRU may be fed back to eNB. The HARQ-ACK bit generated as response for multicast transmission(s) may be concatenated to the HARQ-ACK response for unicast transmission(s) from the same WTRU. In such scenarios, the number of scheduled PUCCH messages may be reduced.

One or more embodiments contemplate scalable video coding transmission over WiFi/802.11. Some embodiments contemplate transmitting SVC video traffic over WiFi/802.11, such as but not limited to live lecture broadcasts in enterprise and/or campus networks. In such scenarios, perhaps if one network may be considered (e.g., perhaps only one network), the hidden-terminal problem may not be a concern, perhaps because one or more, or all, non-access point (AP) stations (STAs) may hear the transmissions from the AP (e.g., which may be the broadcast transmitter).

In WiFi/802.11, embodiments recognize that broadcast (multicast) may be achieved by putting the broadcast address (e.g., a multicast address) in the MAC PDU (MPDU) header and transmitting the MPDU. Embodiments recognize performance issues that may be related to the use of broadcast/multicast over WiFi (e.g., as may be defined in the applicable standards). For example, embodiments recognize that the broadcast transmitter may not retransmit and may not back off in the event of collision, perhaps because there may be no ACK defined for broadcast to indicate successful transmission (e.g., which may also be the case for LTE/LTE-A). Embodiments also recognize that in the case of LTE/LTE-A, medium access may be based on scheduling by the eNB, and there may be no collision. Embodiments further recognize that the lack of collision detection and/or backoff in broadcast in WiFi may create unreliable broadcast and/or unfairness for unicast transmitters. Embodiments recognize the use of pseudo-broadcast and/or the selection of the receiver for pseudo-broadcast to address one or more of these performance issues.

Embodiments recognize that in pseudo-broadcast a MPDU may be addressed to a particular STA (e.g., that may be called a target client) and may be transmitted as a unicast packet. Other STAs may be in the promiscuous mode, which may allow a STA to process the overheard packets, perhaps even if the packets are not addressed to that STA. The target client may reply to the transmitter with an ACK if it successfully receives that MPDU. Embodiments recognize that pseudo-broadcast may implement wireless broadcast while perhaps being able to obtain an ACK from a target client. Embodiments recognize that such schemes may, at least partially, address the unreliability and/or unfairness issue resulting from the broadcast mechanism defined in the WiFi/802.11 standards.

Embodiments also recognize that when pseudo-broadcast may be used, perhaps if the target client may have a good channel (e.g., which may be indicated by the RSSI or CSI defined in the applicable standard(s), or by other technique), the STAs that may have (relatively) worse channels might not be able to successfully receive the unicast packet. Embodiments recognize that a choice of the STA with the worst channel as the target client may address such issues. In such scenarios, perhaps in the absence of hidden-terminal problems, if the target client may successfully receive the MPDU, one or more, or all, other STAs may also successfully receive the MPDU (in promiscuous mode).

Figure 18:
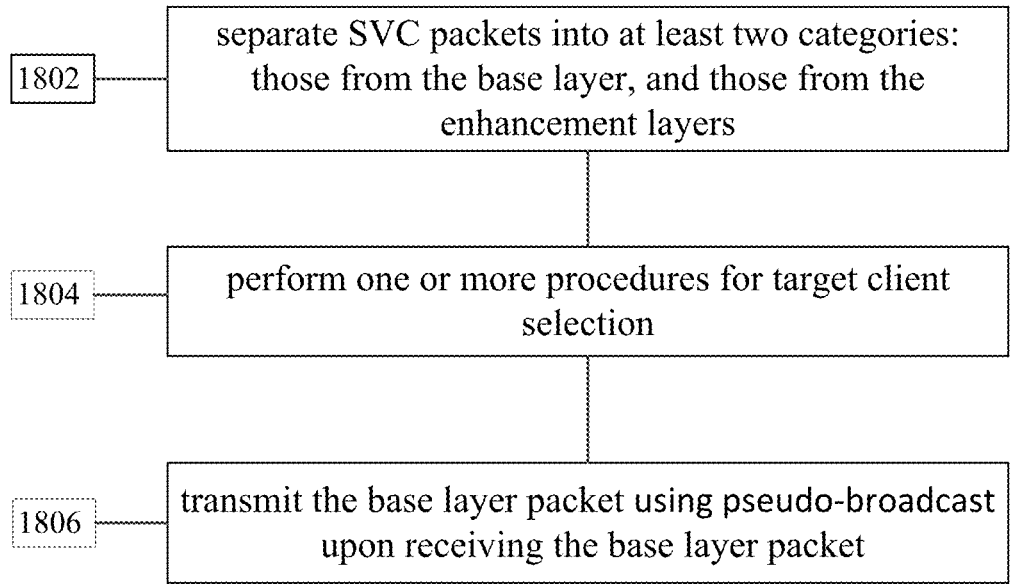
FIG. 18 is a flowchart of an example technique of transmitting SVC formatted packets consistent with embodiments.

One or more embodiments contemplate that broadcast/multicast may be used to transmit the packets from the SVC base layer. One or more embodiments also contemplate that unicast may be used to transmit the packets from SVC enhancement layers. FIG. 18 illustrates a flowchart of an example technique that may be executed in some embodiments, perhaps if the video traffic generated from the traffic source may already be in SVC format, among other scenarios. In FIG. 18, at 1802, the MAC layer may separate SVC packets into at least two categories: those from the base layer (e.g., PKT_BASE), and those from the enhancement layers (e.g., PKT_NON_BASE). In some embodiments, this can be done, for example, by using different port numbers for the connections that may carry PKT_BASE packets and the connections that may carry PKT_NON_BASE packets, and/or by using deep packet inspection.

At 1804, the AP may perform one or more procedures for target client selection (e.g., known procedures). At 1806, perhaps if the MAC at the AP my receive a PKT_BASE packet, it may transmit the packet using pseudo-broadcast. That is, the PKT_BASE packet may be addressed to the target client as a standard unicast packet. In some embodiments, other STAs may listen in promiscuous mode. In such scenarios, the broadcast of the PKT_BASE packet may be implemented perhaps while getting an ACK from the target client, which may ensure fairness for other unicast transmitters. In some embodiments, perhaps if the MAC at the AP may receive a PKT_NON_BASE packet, among other reasons, it may transmit the packet using standard unicast. In such scenarios, the PKT_NON_BASE packet may be sent to one or more, or all, the STAs individually using unicast.

In some embodiments, alternatively or additionally to the example technique described with respect to FIG. 18, perhaps if the video traffic generated from the traffic source might not be SVC, among other scenarios, a transcoder can be used at the AP to transcode the video traffic into SVC format. The bit rate for the base layer can be set to match the data rate of the link between the AP and the target client. As the link quality between the AP and the target client may change, the bit rate for the base layer can also change. Although some embodiments contemplate that SVC might be less efficient than advanced video coding (AVC), some embodiments also contemplate that the utilization of broadcast may provide a savings in radio resources (e.g., a relatively significant savings), and/or may facilitate an improvement of the overall video quality to one or more, or all, users.

Figure 19:
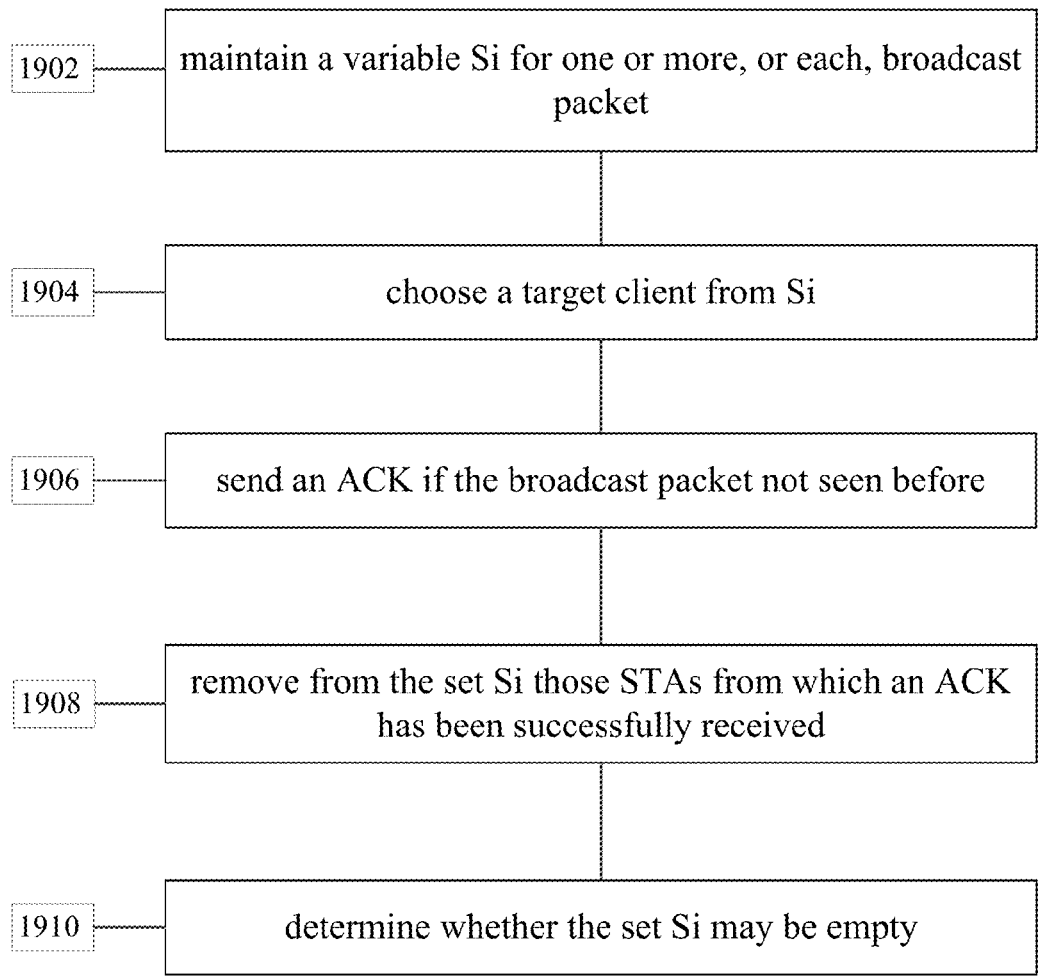
FIG. 19 is a flowchart of an example technique utilizing an ACKed-broadcast consistent with embodiments.

One or more embodiments contemplate the successful delivery of one or more, or each, MPDU that may carry a base layer packet, perhaps while taking advantage of the broadcast nature of the wireless medium for improved efficiency. FIG. 19 illustrates an example technique utilizing an ACKed-broadcast contemplated by one or more embodiments. At 1902, a transmitter may maintain a variable Si for one or more, or each broadcast packet, which may be the set of STAs that might have not yet successfully received the broadcast packet i. At 1904, the transmitter may choose a target client from Si, perhaps according to the same criteria that may be used in a pseudo-broadcast, which may be that the STA with the worst channel may be selected as the target client. The MCS used for constructing the broadcast packet may be determined to match the channel of the target client. A sequence number may be used in the broadcast packet to identify different broadcast packets, for example.

At 1906, one or more, or each, STA may send an ACK if it might not have seen this broadcast packet before. In the ACK, it may be indicated which broadcast packet is being acknowledged. At 1908, the transmitter may remove from the set Si those STAs from which it may have successfully received an ACK. At 1910, a determination may be made regarding whether the set Si may be empty. One or more of the elements of the example technique may be repeated, perhaps until the set Si may become empty.

In some embodiments, perhaps as one or more, or each, time the MCS may be determined by the channel of the target client, the probability of a STA in the set Si that might not successfully receive the broadcast packet may be relatively small (e.g., relative very small). In such scenarios, the algorithm may converge relatively quickly.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method for sending data, the method comprising:
sending a configuration to a first WTRU for a first downlink shared channel (first DL-SCH) for one or more unicast transmissions;
receiving a first signal-to-noise ratio (first SNR) of the first WTRU;
sending a configuration to the first WTRU for a second downlink shared channel (second DL-SCH) for one or more multicast transmissions;
sending to the first WTRU at least one unicast transmission over the first DL-SCH, the at least one unicast transmission including scalable video coding (SVC) enhanced layer data and an indication to the first WTRU to activate at least one multicast receiver;
sending to the first WTRU at least one multicast transmission over the second DL-SCH, the at least one multicast transmission including SVC base layer data;
sending the at least one multicast transmission to a second WTRU;
receiving a second SNR of the second WTRU; and
determining a throughput for the at least one multicast transmission based, at least in part, on the lower of the first SNR or the second SNR.

2. The method of claim 1, wherein the at least one multicast transmission and the at least one unicast transmission share a common hybrid automatic repeat request (HARQ) entity.

3. The method of claim 1, wherein the at least one multicast transmission and the at least one unicast transmission use respectively dedicated hybrid automatic repeat request (HARQ) entities.

4. The method of claim 3, wherein at least one of the dedicated HARQ entities communicates with a multicast transmission/unicast transmission switching entity.

5. The method of claim 1, wherein the first WTRU and the second WTRU are two of a plurality of wireless transmit/receive units (WTRUs), the plurality of WTRUs are logically grouped for receiving the one or more multicast transmissions, the method further comprising:
receiving a group radio network temporary identifier (G-RNTI) at one or more of the plurality of WTRUs.

6. The method of claim 1, wherein the first WTRU and the second WTRU are two of a plurality of wireless transmit/receive units (WTRUs), the plurality of WTRUs are logically grouped for receiving the one or more multicast transmissions over the second DL-SCH, the method further comprising:
sending by one or more of the plurality of WTRUs at least one of an acknowledgement (ack) or a negative acknowledgement (nack) via a physical uplink control channel (PUCCH) in regard to the one or more multicast transmissions received over the second DL-SCH.

7. The method of claim 1, wherein the SVC base layer data corresponds to a first priority and the SVC enhanced layer data corresponds to a second priority, at least one of the first priority or the second priority being based on a quality of service (QoS).

8. The method of claim 1, wherein at least one retransmission of the at least one multicast transmission is received via at least one unicast transmission of the one or more unicast transmissions.

9. The method of claim 1, wherein the first WTRU and the second WTRU are two of a plurality of wireless transmit/receive units (WTRUs), the plurality of WTRUs are logically grouped for receiving the one or more multicast transmissions, the second WTRU has a highest multicast performance relative to the plurality of WTRUs, the method further including:
receiving at one or more of the plurality of WTRUs a cell radio network temporary identifier (C-RNTI) of the second WTRU, the C-RNTI of the second WTRU providing a reference to the second DL-SCH for the one or more of the plurality of WTRUs.

10. The method of claim 1, further comprising:
receiving feedback for shared multicast channel quality indication (CQI) information.

11. The method of claim 1, wherein the indication is sent via a medium access control (MAC) signal.

12. An evolved node-B (eNB), comprising:
a memory; and
a processor in communication with the memory, the processor configured at least in part to:
provide a configuration to a first wireless transmit/receive unit (WTRU) for a first downlink shared channel (first DL-SCH) for one or more unicast transmissions;
receive a first signal-to-noise ratio (first SNR) of the first WTRU;
provide a configuration to the first WTRU for a second downlink shared channel (second DL-SCH) for one or more multicast transmissions;
initiate the sending to the first WTRU at least one unicast transmission over the first DL-SCH, the at least one unicast transmission including scalable video coding (SVC) enhanced layer data and an indication to the first WTRU to activate at least one multicast receiver;
initiate the sending of at least one multicast transmission to the first WTRU over the second DL-SCH, the at least one multicast transmission including SVC base layer data;
initiate the sending of the at least one multicast transmission to a second WTRU;
receive a second SNR of the second WTRU; and
determine a throughput for the at least one multicast transmission based, at least in part, on the lower of the first SNR or the second SNR.

13. The eNB of claim 12, wherein the first WTRU and the second WTRU are two of a plurality of wireless transmit/receive units (WTRUs), the eNB is in communication with the plurality of WTRUs, the plurality of WTRUs are logically grouped for receiving the at least one multicast transmission, the processor being further configured to:
provide a group radio network temporary identifier (G-RNTI) to one or more of the plurality of WTRUs.

14. The eNB of claim 12, wherein the processor is further configured to provide the configuration of the first DL-SCH and the configuration of the second DL-SCH such that the first DL-SCH and the second DL-SCH are in communication with respectively dedicated hybrid automatic repeat request (HARQ) entities.

15. The eNB of claim 12, wherein the processor is further configured to provide the configuration of the first DL-SCH and the configuration of the second DL-SCH such that the first DL-SCH and the second DL-SCH are in communication with a shared hybrid automatic repeat request (HARQ) entity.

16. The eNB of claim 12, wherein the indication is sent via a medium access control (MAC) signal.

17. The eNB of claim 12, wherein the SVC base layer data corresponds to a first priority and the SVC enhanced layer data corresponds to a second priority, at least one of the first priority or the second priority being based on a quality of service (QoS).

18. The eNB of claim 12, wherein at least one retransmission of the at least one multicast transmission is received via at least one unicast transmission of the one or more unicast transmissions.

* * * * *